(12) United States Patent
Nishio et al.

(10) Patent No.: US 11,459,276 B2
(45) Date of Patent: Oct. 4, 2022

(54) ALUMINA-BASED HEAT CONDUCTIVE OXIDE AND METHOD FOR PRODUCING SAME

(71) Applicant: DAINICHISEIKA COLOR & CHEMICALS MFG. CO., LTD., Tokyo (JP)

(72) Inventors: Akira Nishio, Tokyo (JP); Kenichi Yamane, Tokyo (JP); Naotsugu Yamamura, Tokyo (JP); Shingo Tominaga, Tokyo (JP); Hiroya Oniduka, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 847 days.

(21) Appl. No.: 15/754,810

(22) PCT Filed: Sep. 6, 2016

(86) PCT No.: PCT/JP2016/076178
§ 371 (c)(1),
(2) Date: Feb. 23, 2018

(87) PCT Pub. No.: WO2017/047452
PCT Pub. Date: Mar. 23, 2017

(65) Prior Publication Data
US 2018/0244578 A1 Aug. 30, 2018

(30) Foreign Application Priority Data

Sep. 16, 2015 (JP) .............................. JP2015-183104
Jan. 26, 2016 (JP) .............................. JP2016-012273
May 2, 2016 (JP) .............................. JP2016-092252

(51) Int. Cl.
| | |
|---|---|
| *C04B 35/111* | (2006.01) |
| *C08K 3/22* | (2006.01) |
| *C09D 11/03* | (2014.01) |
| *C09D 175/04* | (2006.01) |
| *C09J 11/04* | (2006.01) |
| *C09J 175/04* | (2006.01) |
| *C09K 5/14* | (2006.01) |
| *C09D 7/61* | (2018.01) |
| *C08L 101/00* | (2006.01) |
| *C09D 201/00* | (2006.01) |
| *C09D 7/40* | (2018.01) |
| *C09J 201/00* | (2006.01) |

(52) U.S. Cl.
CPC .............. *C04B 35/111* (2013.01); *C08K 3/22* (2013.01); *C08L 101/00* (2013.01); *C09D 7/40* (2018.01); *C09D 7/61* (2018.01); *C09D 11/03* (2013.01); *C09D 175/04* (2013.01); *C09D 201/00* (2013.01); *C09J 11/04* (2013.01); *C09J 175/04* (2013.01); *C09J 201/00* (2013.01); *C09K 5/14* (2013.01); *C08K 2003/2227* (2013.01)

(58) Field of Classification Search
CPC ........... C04B 35/111; C04B 2235/9607; C04B 2235/349; C08L 101/00; C09D 201/00; C09D 7/61; C09D 175/04; C09D 11/03; C09J 175/04; C09J 11/04; C09K 5/14; C08K 3/22; C08K 2003/2227
See application file for complete search history.

(56) References Cited

U.S. PATENT DOCUMENTS

| | | |
|---|---|---|
| 3,271,171 A | 9/1966 | Burgyan et al. |
| 4,487,756 A | 12/1984 | Mizrah et al. |
| 5,935,550 A | 8/1999 | Mohri et al. |
| 2001/0027623 A1 | 10/2001 | Rosenflanz |
| 2005/0035230 A1 | 2/2005 | Kanbara et al. |
| 2005/0182172 A1 | 8/2005 | Kamimura et al. |
| 2006/0189740 A1 | 8/2006 | Kamimura et al. |
| 2009/0320719 A1 | 12/2009 | Lee et al. |
| 2011/0251042 A1* | 10/2011 | Araki ................ C04B 35/62655 501/32 |
| 2014/0322534 A1 | 10/2014 | Suzuki et al. |
| 2015/0045490 A1 | 2/2015 | Riebel et al. |

(Continued)

FOREIGN PATENT DOCUMENTS

| | | |
|---|---|---|
| CN | 102363577 | 2/2012 |
| CN | 105174921 | 12/2015 |

(Continued)

OTHER PUBLICATIONS

Extended European Search Report, issued in the corresponding European application No. 16846323.0, dated Feb. 11, 2019, 11 pages.

(Continued)

*Primary Examiner* — Daniel J. Schleis
*Assistant Examiner* — Kevin Ct Li
(74) *Attorney, Agent, or Firm* — Hamre, Schumann, Mueller & Larson, P.C.

(57) ABSTRACT

The present invention provides an alumina-based thermally conductive oxide that is excellent not only in thermal conductivity but also in chemical resistance, water resistance, and electrical insulation, that has a good kneadability (miscibility) into resins, and that enables to produce a material or an article, such as a resin composition, which is excellent in shapability. The present invention is an alumina-based thermally conductive oxide obtained by firing a starting material mixture containing an aluminum starting material. The aluminum starting material is at least one selected from the group consisting of boehmite, aluminum hydroxide, and alumina, the starting material mixture further contains at least one additional starting material selected from the group consisting of talc, a frit, a boric acid compound, a molybdenum compound, titanium oxide, a magnesium compound, a zinc compound, a zirconium compound, a phosphoric acid compound, and a tungsten compound, and the content of the additional starting material in the starting material mixture is 0.1 to 20 parts by mass based on 100 parts by mass of the aluminum starting material.

16 Claims, No Drawings

(56) References Cited

U.S. PATENT DOCUMENTS

| | | |
|---|---|---|
| 2016/0264832 A1 | 9/2016 | Yuan et al. |
| 2016/0369148 A1 | 12/2016 | Nishio et al. |
| 2017/0158807 A1* | 6/2017 | Yoshimoto ......... C08G 59/3218 |
| 2018/0244578 A1 | 8/2018 | Nishio et al. |

FOREIGN PATENT DOCUMENTS

| | | | |
|---|---|---|---|
| CN | 105658715 | 6/2016 | |
| CN | 108025980 | 5/2018 | |
| EP | 3272709 | 1/2018 | |
| JP | 51-056813 | 5/1976 | |
| JP | 59-097528 | 6/1984 | |
| JP | 62-191420 | 8/1987 | |
| JP | 63-319298 | 12/1988 | |
| JP | 63-319299 | 12/1988 | |
| JP | 04-021640 | 4/1992 | |
| JP | 04-022880 | 4/1992 | |
| JP | 05-170449 | 7/1993 | |
| JP | 07-206430 | 8/1995 | |
| JP | 07-206432 | 8/1995 | |
| JP | 10-044585 | 2/1998 | |
| JP | 2002-348116 | 12/2002 | |
| JP | 2003-002642 | 1/2003 | |
| JP | 2003-192339 | 7/2003 | |
| JP | 2003-521435 | 7/2003 | |
| JP | 2004-027177 | 1/2004 | |
| JP | 2005-022963 | 1/2005 | |
| JP | 3744010 | 12/2005 | |
| JP | 3850371 | 11/2006 | |
| JP | 2007-045876 | 2/2007 | |
| JP | 2007-070608 | 3/2007 | |
| JP | 2007-169516 | 7/2007 | |
| JP | 2008-127257 | 6/2008 | |
| JP | 2011-219301 | 11/2011 | |
| JP | 2014-009140 | 1/2014 | |
| JP | 2014009140 A * | 1/2014 | |
| JP | 2014-218424 | 11/2014 | |
| JP | 2015-010200 | 1/2015 | |
| JP | 2015-034269 | 2/2015 | |
| JP | 5720848 | 5/2015 | |
| JP | 2016-135841 | 7/2016 | |
| JP | 5975182 | 8/2016 | |
| TW | 201609943 * | 3/2016 | |
| WO | 2001/056946 | 8/2001 | |
| WO | 2002/098796 | 12/2002 | |
| WO | 2013/039103 | 3/2013 | |
| WO | 2013/084750 | 6/2013 | |
| WO | 2014/051091 | 4/2014 | |
| WO | 2014/136773 | 9/2014 | |
| WO | 2015/060125 | 4/2015 | |
| WO | WO-2015060125 A1 * | 4/2015 | ............ C01F 7/021 |
| WO | 2015/137468 | 9/2015 | |

OTHER PUBLICATIONS

International Search Report, issued in the corresponding PCT application No. PCT/JP2016/076178, dated Oct. 18, 2016, 5 pages.
Chinese Office Action, issued in the corresponding Chinese patent application No. 201680053811.5, dated May 29, 2020, 17 pages.
Korean Office Action Report, issued in the corresponding Korean application No. 10-2018-7007171, dated Jun. 28, 2019, 10 pages including a machine translation, where the references cited in the action were filed previously in the IDS in the present application.
Indian Office Action, issued in the corresponding Indian patent application No. 201817006900, dated Oct. 16, 2019, 5 pages.
Taiwanese Office Action, issued in the Taiwanese patent application No. 107107079 dated Nov. 21, 2020, 10 pages, corresponding to U.S. Appl. No. 16/486,793.
Extended European Search Report, issued in the European patent application No. 18761134.8, dated Sep. 16, 2020, 7 pages,corresponding to U.S. Appl. No. 16/486,793.
Second Chinese Office Action, issued in the Chinese patent application No. 201880014859.4, dated Jul. 29, 2020, 13 pages including English machine translation, corresponding to U.S. Appl. No. 16/486,793.
Indian Examination Report, issued in the Indian patent application No. 201917033773, dated Mar. 9, 2020, 5 page, corresponding to U.S. Appl. No. 16/486,793.
Zaichuk et al., "Improvement of the Compositions and Properties of Gray Ceramic Pigments", Glass and Ceramics, vol. 70, Nos. 5-6, Sep. 2013 (Russian Original Nos. 5-6, May-Jun. 2013), pp. 229-233.
First Chinese Office Action, issued in the Chinesepatent application No. 201880014859.4, dated Feb. 3, 2020, 14 pages including English machine translation, corresponding to U.S. Appl. No. 16/486,793.
International Search Report, issued in the PCT application No. PCT/JP2018/007251, dated Mar. 27, 2018, 6 pages, corresponding to U.S. Appl. No. 16/486,793.

* cited by examiner

ALUMINA-BASED HEAT CONDUCTIVE OXIDE AND METHOD FOR PRODUCING SAME

TECHNICAL FIELD

The present invention relates to an alumina-based thermally conductive oxide and a method for producing the same, and to a thermally conductive composition, an article, a liquid composition, and a thermally conductive thin film each using the alumina-based thermally conductive oxide.

BACKGROUND ART

Currently, a large number of materials have been studied as a thermally conductive material. As the degree of integration in semiconductor elements improves, requirements for thermal dissipation have been getting stricter, and therefore the development of a material having far higher thermal conductivity and electrical insulation than conventional materials is essential. As a material that satisfies such requirements, a composite material (resin composition) obtained by kneading a thermally conductive filler into a resin is known.

As a filler for use in the composite material, magnesium oxide having a higher thermal conductivity than silica and having a lower hardness than alumina has been studied. Magnesium oxide has characteristics of having a high melting point, a high thermal conductivity, and a low toxicity, and therefore has been widely used as a heat-resistant material or a filler. Further, improving the performance of magnesium oxide by applying various surface treatments has also been studied in recent years.

However, magnesium oxide has a higher hygroscopicity than silica and alumina. Therefore, in the composite material using magnesium oxide as a filler, cracks are liable to occur due to the volume expansion of the filler accompanied by moisture absorption, so that the thermal conductivity may be liable to be lowered. Thus, in the case of the composite material using magnesium oxide as a filler, there has been a problem in securing the stability of semiconductor elements and the like over a long period of time. In addition, using zinc oxide as a filler has also been studied. However, zinc oxide has a problem of having low stability and electrical insulation against moisture and acids.

Besides, boron nitride, aluminum nitride, and the like are used as a thermally conductive material for a filler. However, these materials are expensive, and it is known that aluminum nitride is inferior in water resistance. Boron nitride has a scaly shape, and therefore the thermal conductivity in an orientation direction is good, but the coefficient of thermal conductivity in a direction orthogonal to the orientation direction cannot be said to be very good. Moreover, it is difficult to increase a filler content when boron nitride is kneaded into a resin. Thus, there is also a problem that the high thermal conductivity of boron nitride cannot be fully utilized. On the other hand, as a thermally conductive material other than metal oxides, there exist a carbon nanotube, diamond, a metal, and the like. However, these materials have electrical conductivity and therefore cannot be used for thermal dissipation in semiconductor elements and the like.

Incidentally, aluminum oxide has been used in various scenes because it is excellent in water resistance and acid resistance, has a good thermal conductivity, and is inexpensive. Further, aluminum oxide that is excellent in kneadability (filling ability) into resins has been required for the purpose of improving the thermal conductivity.

It is to be noted that, as a related conventional technique, there is proposed a magnesium oxide filler for compounding into a resin, the magnesium oxide making it possible to provide a shaped article excellent in shaping processability and the like (Patent Literature 1). In addition, there is proposed a magnesium oxide powder having a coating layer formed on the surface thereof, the coating layer containing: a double oxide of silicon and magnesium; and the like (Patent Literature 2). Further, there is proposed an inorganic filler composite body constituted by boehmite or zinc oxide having a predetermined shape, the boehmite or zinc oxide being bonded, etc. to a surface of a thermally conductive filler such as boron nitride, aluminum nitride, magnesium oxide, a glass bead, or alumina (Patent Literature 3). Furthermore, there is proposed an aluminum borate whisker that is excellent in chemical resistance and electrical insulation, that is used as a reinforcing material for a thermoplastic resin, and that is represented by a predetermined composition formula (Patent Literatures 4 and 5).

In addition, with miniaturization of electronic devices, it has become difficult to provide a heat dissipation mechanism utilizing a heat sink, a fan, or the like in many cases. Thus, a method for providing a coating layer (thermally conductive thin layer) having a good thermal conductivity on the surface of a heat-generating element has been attracting attention. In a coating agent (liquid composition) for forming such a thermally conductive thin film, a resin for forming a thin film; and an inorganic filler are often contained.

For example, there is proposed a thermally conductive resin composition containing aluminum oxide and aluminum nitride (Patent Literature 6). Moreover, there is proposed a thermally conductive resin composition containing boron nitride (Patent Literature 7). Further, there is proposed a heat-dissipating ink containing magnesium oxide or aluminum hydroxide (Patent Literatures 8 and 9).

CITATION LIST

Patent Literature

Patent Literature 1: Japanese Patent Laid-Open No. 2007-70608
Patent Literature 2: Japanese Patent No. 3850371
Patent Literature 3: International Publication No. WO 2013039103
Patent Literature 4: Japanese Patent Publication No. 4-21640
Patent Literature 5: Japanese Patent Publication No. 4-22880
Patent Literature 6: Japanese Patent Laid-Open No. 2015-10200
Patent Literature 7: Japanese Patent Laid-Open No. 2015-34269
Patent Literature 8: Japanese Patent Laid-Open No. 2007-45876
Patent Literature 9: Japanese Patent Laid-Open No. 2007-169516

SUMMARY OF INVENTION

Technical Problem

However, in the magnesium oxide filler proposed in Patent Literature 1, even though the properties such as the shaping processability and the thermal conductivity have been improved, overall physical properties including the hardness have been insufficient yet. Moreover, in the magnesium oxide powder proposed in Patent Literature 2, even though the water resistance has been improved, the chemical resistance has been insufficient yet. Further, the inorganic filler composite body proposed in Patent Literature 3 has been insufficient in terms of the water resistance and the thermal conductivity. Furthermore, the aluminum borate whisker proposed in Patent Literatures 4 and 5 has a low kneadability (miscibility) into resins, and therefore it has been difficult to obtain a resin composition having a high filling ability.

In addition, the inorganic filler for use in a resin composition, the inorganic filler proposed in Patent Literature 6, has a high hardness (Mohs hardness=8 to 9), and therefore a coating roll is liable to be damaged during coating. Moreover, aluminum nitride easily reacts with moisture in the atmospheric air, and therefore there is concern that a resin in a formed thin film is liable to deteriorate with time. On the other hand, the boron nitride for use in a resin composition, the boron nitride proposed in Patent Literature 7, has a low hardness (Mohs hardness=2) while having a good thermal conductivity. However, the boron nitride has a scaly shape, and therefore a thin film to be formed has anisotropy in the thermal conductivity, so that the thermal conductivity in a thickness direction of the thin film may be insufficient.

In addition, the magnesium oxide for use in a heat-dissipating ink, the magnesium oxide proposed in Patent Literature 8, has a relatively high hardness (Mohs hardness=6), and the application may be limited in that the magnesium oxide has poor water resistance and acid resistance. Furthermore, the aluminum hydroxide for use in a heat-dissipating ink, the aluminum hydroxide proposed in Patent Literature 9, has a low thermal conductivity among thermally conductive inorganic fillers, and therefore the filling rate needs to be increased in order to obtain a sufficient thermal conductivity. Accordingly, the content ratio of the resin in a formed thin film is relatively decreased, and therefore there is concern that the film-forming property and the adhesiveness to a base material are lowered.

The present invention has been completed in consideration of these problems of the conventional techniques and intends to provide an alumina-based thermally conductive oxide that is excellent not only in thermal conductivity but also in chemical resistance, water resistance, and electrical insulation, that has a good kneadability (miscibility) into resins, and that enables to produce a material or an article, such as a resin composition, which is excellent in shapability, and to provide a method for producing the alumina-based thermally conductive oxide. Moreover, the present invention intends to provide a thermally conductive composition and an article each using the alumina-based thermally conductive oxide.

Further, the present invention intends to provide: a liquid composition that enables to form a thermally conductive thin film excellent in thermal conductivity, chemical resistance, and adhesiveness to various base materials and that has a good handling property; a thermally conductive thin film formed using the liquid composition; and a member for an electronic device, the member provided with the thermally conductive thin film.

Solution to Problem

That is, according to the present invention, the following alumina-based thermally conductive oxide is provided.

[1] An alumina-based thermally conductive oxide obtained by firing a starting material mixture comprising an aluminum starting material, wherein the aluminum starting material is at least one selected from the group consisting of boehmite, aluminum hydroxide, and alumina, the starting material mixture further comprises at least one additional starting material selected from the group consisting of talc, a frit, a boric acid compound, a molybdenum compound, titanium oxide, a magnesium compound, a zinc compound, a zirconium compound, a phosphoric acid compound, and a tungsten compound, and a content of the additional starting material in the starting material mixture is 0.1 to 20 parts by mass based on 100 parts by mass of the aluminum starting material.

[2] The alumina-based thermally conductive oxide according to [1], wherein the frit comprises Si and further comprises at least one element selected from the group consisting of Li, B, Na, K, Mg, Ca, Al, Zn, F, Ti, Zr, and P, and the frit is a non-colored grade that does not substantially comprises Pb.

[3] The alumina-based thermally conductive oxide according to [1] or [2], wherein the aluminum starting material has a shape of a particle having a number average particle diameter of 0.1 to 80 m.

Further, according to the present invention, the following method for producing the alumina-based thermally conductive oxide is provided.

[4] A method for producing the alumina-based thermally conductive oxide according to any one of [1] to [3], the method comprising: a step of mixing at least one aluminum starting material selected from the group consisting of boehmite, aluminum hydroxide, and alumina with at least one additional starting material selected from the group consisting of talc, a frit, a boric acid compound, a molybdenum compound, titanium oxide, a magnesium compound, a zinc compound, a zirconium compound, a phosphoric acid compound, and a tungsten compound, thereby obtaining a starting material mixture; and a step of firing the obtained starting material mixture, wherein a content of the additional starting material in the starting material mixture is 0.1 to 20 parts by mass based on 100 parts by mass of the aluminum starting material.

[5] The method for producing the alumina-based thermally conductive oxide according to [4], wherein the starting material mixture is fired at 600 to 1,500° C.

[6] The method for producing the alumina-based thermally conductive oxide according to [4] or [5], wherein the starting material mixture is obtained by mixing the aluminum starting material with the additional starting material by a wet process or a dry process.

Moreover, according to the present invention, the following thermally conductive composition and article are provided.

[7] A thermally conductive composition comprising: the alumina-based thermally conductive oxide according to any one of [1] to [3]; and a thermally conductive filler.

[8] An article comprising the alumina-based thermally conductive oxide according to any one of [1] to [3].

[9] The article according to [8], further comprising a thermally conductive filler.

[10] The article according to [8] or [9], being any one of a gravure ink, a coating liquid, a resin composition, and an adhesive composition.

Furthermore, according to the present invention, the following liquid composition, thermally conductive film, and member for an electronic device are provided.

[11] A liquid composition to be used for forming a thermally conductive thin film, wherein the liquid composition comprises: a thermally conductive component comprising the alumina-based thermally conductive oxide according to any one of [1] to [3]; a resin for forming a film; and a solvent.

[12] The liquid composition according to [11], wherein the thermally conductive component further comprises at least one selected from the group consisting of barium sulfate, talc, and boron nitride.

[13] The liquid composition according to [11] or [12], wherein a content of the thermally conductive component is 20 to 200 parts by mass based on 100 parts by mass of the resin for forming a film.

[14] The liquid composition according to any one of [11] to [13], wherein the resin for forming a film is at least one solvent-soluble resin selected from the group consisting of an acrylic-based resin, a urethane-based resin, a urea-based resin, an epoxy-based resin, a rubber-based resin, a fluorine-based resin, a polyamide-based resin, a polyimide-based resin, a silicone-based resin, a cellulose-based resin, and a thermoplastic elastomer.

[15] A thermally conductive thin film formed through coating with the liquid composition according to any one of [11] to [14].

[16] A member for an electronic device, the member comprising: a metallic member; and the thermally conductive thin film according to [15] disposed on a surface of the metallic member.

Advantageous Effects of Invention

According to the present invention, an alumina-based thermally conductive oxide that is excellent not only in thermal conductivity but also in chemical resistance, water resistance, and electrical insulation, that has a good kneadability (miscibility) into resins, and that enables to produce a material or an article, such as a resin composition, which is excellent in shapability, and a method for producing the alumina-based thermally conductive oxide can be provided. Moreover, according to the present invention, a thermally conductive composition and an article each using the alumina-based thermally conductive oxide can be provided.

Further, according to the present invention, a liquid composition that enables to form a thermally conductive thin film excellent in thermal conductivity, chemical resistance, and adhesiveness to various base materials and that has a good handling property; a thermally conductive thin film formed using the liquid composition; and a member for an electronic device, the member provided with the thermally conductive thin film, can be provided.

DESCRIPTION OF EMBODIMENTS

<Alumina-Based Thermally Conductive Oxide>

Hereinafter, an embodiment according to the present invention will be described, but the present invention is not limited to the embodiment below. An alumina-based thermally conductive oxide (hereinafter, also simply written as "thermally conductive oxide") according to the present invention is obtained by firing a starting material mixture comprising an aluminum starting material. In addition, the aluminum starting material is at least one selected from boehmite, aluminum hydroxide, and alumina, and the starting material mixture further comprises at least one additional starting material selected from the group consisting of talc, a frit, a boric acid compound, a molybdenum compound, titanium oxide, a magnesium compound, a zinc compound, a zirconium compound, a phosphoric acid compound, and a tungsten compound. Further, the content of the additional starting material in the starting material mixture is 0.1 to 20 parts by mass based on 100 parts by mass of the aluminum starting material. Hereinafter, the details of the thermally conductive oxide according to the present invention will be described.

Generally, a resin has a low thermal conductivity. Therefore, to improve the thermal conductivity of a resin article, a method of adding a large amount of a thermally conductive filler such as alumina to the resin is usually adopted. By blending and dispersing the thermally conductive filler with the resin so that the thermally conductive fillers have a contact point with one another, the thermal conductivity that is characteristic of the thermally conductive filler is exhibited. To exhibit a higher thermal conductivity, designing is performed so that a large amount of alumina can be easily dispersed in a resin by using alumina having a larger particle diameter or using alumina having a spherical shape. However, when alumina thus designed is blended in a resin, the contact points among alumina particles are decreased, so that the thermal conductivity is not increased so much in many cases. On the other hand, when alumina having a smaller particle diameter is added to a resin, the kneadability (miscibility) into the resin is lowered to make it difficult to disperse a large amount of alumina in the resin, so that it becomes difficult to improve the thermal conductivity.

The thermally conductive oxide according to the present invention is obtained by firing a starting material mixture comprising an aluminum starting material such as alumina and an additional starting material such as talc or a frit in a predetermined ratio. The aluminum starting material and the additional starting material are melt during firing, and part of the starting materials reacts to produce a thermally conductive oxide. That is, it is considered that the additional starting material that is blended in a small amount functions as a flux (mineralizer) to have an effect of allowing part of the aluminum starting materials to bond to one another or making the surface of the thermally conductive oxide smooth. Thereby, even though the number of contact points among thermally conductive oxides is large, the thermally conductive oxide having a high wettability to resins is obtained, so that the thermal conductivity is improved, and a material or an article, such as a resin composition, which is excellent in shapability can be produced.

As can be understood from this point, there is no need to particularly use the aluminum starting material having a large particle diameter or having a spherical shape. Further, by adjusting the amount of the additional starting material to be blended, the filling ability to resins can be enhanced, and the thermally conductive oxide can be made to have a higher coefficient of thermal conductivity than alumina that is generally used as a thermally conductive filler.

The thermally conductive oxide according to the present invention is not only excellent in thermal conductivity but also excellent in chemical resistance, water resistance, and electrical insulation. In addition, the thermally conductive oxide according to the present invention has a high wettability to resins and a good kneadability (miscibility) into resins, and therefore enables to produce a material such as a resin composition, or an article such as a paint or an adhesive composition, which is excellent in shapability.

(Aluminum Starting Material)

The thermally conductive oxide according to the present invention is obtained by firing a starting material mixture comprising an aluminum starting material and an additional starting material, and is preferably constituted by α-alumina as the main component. The aluminum starting material is at least one selected from the group consisting of boehmite, aluminum hydroxide, and alumina.

Alumina finally becomes α-alumina (α-$Al_2O_3$) via intermediate alumina having a different crystal composition (such as α, γ, η, θ, χ, and κ) depending on the difference in the starting material and in the firing temperature. α-alumina is industrially produced by extracting an alumina component from bauxite being a raw material with an alkaline solution such as caustic soda, then forming aluminum hydroxide, and firing the aluminum hydroxide (Beyer method). Aluminum hydroxide obtained by the above-described method is usually gypsite ($Al_2O_3 \cdot 3H_2O$) being a trihydrate. Generally, aluminum hydroxide, such as gypsite, bayerite, or boehmite (inorganic compound containing 90% or more of AlO(OH)), which is other than diaspore, or an amorphous alumina hydrate such as alumina gel is dehydrated through firing to finally become most stable α-alumina via intermediate alumina such as η-alumina, λ-alumina, γ-alumina, κ-alumina, or θ-alumina. It is well known that this transition includes transition series which are specific to the starting material, the firing condition, and the atmosphere.

As alumina, in addition to stable α-alumina, γ-alumina and θ-alumina which are transition alumina are preferably used. Further, as the aluminum starting material, boehmite and aluminum hydroxide can be used. The shape and particle diameter of the aluminum starting material give an influence on the thermal conductivity and kneadability into resins of the thermally conductive oxide to be obtained. The aluminum starting material preferably has a shape of a particle having a number average particle diameter of 0.1 to 80 μm. More specific examples of the shape of the aluminum starting material include a spherical shape and an amorphous shape.

(Additional Starting Material)

The additional starting material that is used together with the aluminum starting material is at least one selected from the group consisting of talc, a frit, a boric acid compound, a molybdenum compound, titanium oxide, a magnesium compound, a zinc compound, a zirconium compound, a phosphoric acid compound, and a tungsten compound. These additional starting materials allow part of particles of the aluminum starting material to bond to one another, or forms a smooth layer on the surfaces of the particles through melting or reaction with the aluminum starting material during firing. Thereby, the wettability of the thermally conductive oxide to be obtained to resins is enhanced to improve the kneadability (miscibility) into resins.

Talc is a compound represented by $Mg_3Si_4O_{10}(OH)_2$. There are various grades of talc, and any grade of talc may be used. Considering the uniformity of the thermally conductive oxide to be obtained, fine powdery talc is preferable. A frit is so-called multicomponent glass and is constituted by several kinds of elements. The melting point of the frit is preferably 400 to 800° C. As the frit, considering performing coloration afterward, a frit of non-colored grade is preferable. Moreover, the frit preferably comprises Si and further comprises at least one element selected from the group consisting of Li, B, Na, K, Mg, Ca, Al, Zn, F, Ti, Zr, and P. When the frit having such a composition is used, the influence of the thermally conductive oxide to be obtained on the thermal conductivity becomes small, and the wettability of the thermally conductive oxide to be obtained to resins is further improved, so that the kneadability (miscibility) into resins can be enhanced further. Further, the frit preferably does not substantially contain Pb.

Examples of the boric acid compound include boric acid, sodium borate, ammonium borate, magnesium borate, and lithium borate. Examples of the molybdenum compound include molybdenum oxide, sodium molybdate, ammonium molybdate, magnesium molybdate, zinc molybdate, and ammonium phosphomolybdate. Examples of the tungsten compound include ammonium tungstate and sodium tungstate. Examples of the titanium oxide include rutile type titanium oxide and anatase type titanium oxide. Examples of the magnesium compound include magnesium hydroxide, magnesium carbonate, magnesium chloride, and magnesium sulfate. In addition, examples of the zinc compound include zinc oxide, zinc carbonate, zinc hydroxide, zinc sulfate, and zinc chloride. Further, examples of the zirconium compound include zirconium oxide.

Boric acid and molybdates are compounds having a high water-solubility. However, these compounds have reactivity with the aluminum starting material, and therefore a complex oxide is formed through firing and the thermally conductive oxide excellent in water resistance can be obtained. For example, when the aluminum starting material and boric acid are fired, aluminum borate is formed. In addition, when the aluminum starting material and a molybdate are fired, aluminum molybdate is formed. Further, when the aluminum starting material and at least any of the magnesium compound, the zinc compound, the zirconium compound, and titanium oxide are fired, a complex oxide is formed in part of the aluminum starting material.

In addition, when a mixture of talc, boric acid, and the aluminum starting material is fired, part of boric acid is reacted with silica in the aluminum starting material and in the talc to form aluminum borate and borosilicate glass, so that the boric acid melts. In this way, the additional starting materials can be used singly or in combinations of two or more thereof.

The content of the additional starting material in the mixture is 0.1 to 20 parts by mass, preferably 0.1 to 10 parts by mass, more preferably 0.1 to 8 parts by mass, particularly preferably 0.3 to 5 parts by mass, and most preferably 0.5 to 5 parts by mass based on 100 parts by mass of the aluminum starting material. When the amount of the additional starting material is less than 0.1 part by mass based on 100 parts by mass of the aluminum starting material, the characteristics of the aluminum starting material become dominant, so that the effects of improving the thermal conductivity and the kneadability into resins cannot be obtained. On the other hand, when the amount of the additional starting material exceeds 20 parts by mass based on 100 parts by mass of the aluminum starting material, the thermal conductivity is conversely lowered. In addition, when the frit is used as the additional starting material, a product is obtained as a lump after firing, and therefore it becomes difficult to obtain the product as a powder. By setting the amount of the additional starting material within the above-described range based on 100 parts by mass of the aluminum starting material, the thermally conductive oxide that is excellent in thermal conductivity, chemical resistance, water resistance, and electrical insulation while the resistances of the aluminum starting material such as alumina are maintained, that has a good kneadability (miscibility) into resins, and that enables to produce a material or an article, such as a resin composition, which is excellent in shapability, can be obtained. The thermally conductive oxide according to the present invention is more excellent in thermal conductivity than any of magnesium oxide, zinc oxide, and aluminum oxide. Further, the thermally conductive oxide according to the present invention is more excellent in water resistance and chemical resistance than any of aluminum nitride, magnesium oxide, and zinc oxide.

(Surface Treatment)

The thermally conductive oxide according to the present invention is also preferably subjected to a surface treatment. In the surface-treated thermally conductive oxide, the affinity and dispersibility to resins are improved, and therefore an article, such as a resin composition, which is excellent in thermal conductivity can be produced. Examples of a compound (treatment agent) to be used for the surface treatment include fatty acids, fatty acid esters, fatty acid metal salts, phosphoric acid esters, phosphoric acid ester metal salts, silane coupling agents, surfactants, polymer flocculants, titanates, and silicon. These treatment agents can be used singly or in combinations of two or more thereof. The amount of the compound to be used for the surface treatment is preferably 0.01 to 5 parts by mass based on 100 parts by mass of the thermally conductive oxide. Examples of the method for the treatment include a method in which a treatment agent is put into a powder of the thermally conductive oxide, and the resultant mixture is mixed to be treated, and a method in which a powder of the thermally conductive oxide after firing is put into a water to be dispersed, a treatment agent is then put into the resultant dispersion, and the resultant mixture is then filtered and dried.

(Use of Thermally Conductive Oxide)

In the preferred utilization of the thermally conductive oxide according to the present invention, addition to various plastics such as thermoplastic resins and thermosetting resins for the purpose of imparting thermal conductivity is effective. It is particularly preferable that the thermally conductive oxide according to the present invention be added to the thermoplastic resins because the degree of freedom of the shapability through injection molding or the like is more increased than in the case where conventional thermally conductive fillers are used. As the thermoplastic resin, polyethylene resins, polypropylene resins, ethylene-propylene copolymers, ethylene-vinyl acetate copolymers, acrylonitrile-ethylene-styrene copolymers, acrylonitrile-butadiene-styrene copolymers, acrylonitrile styrene copolymers, polyvinylchloride resins, polystyrene resins, polyacrylonitrile resins, polyamide resins, thermoplastic polyimide resins, thermoplastic urethane resins, polyamino bismaleimide resins, polyamideimide resins, polyetherimide resins, methyl polymethacrylate resins, polyvinyl acetate resins, polycarbonate resins, polyacetal resins, polyethylene terephthalate resins, polybutylene terephthalate resins, polyphenylene oxide resins, polyphenylene sulfide resins, polysulfone resins, polyether sulfone resins, polyether ether ketone resins, polyallylsulfone resins, bismaleimide triazine resins, polymethylpentene resins, fluorinated resins, liquid crystal polymers, olefin-vinyl alcohol copolymers, ionomer resins, and polyarylate resins can be used. These thermoplastic resins can be used singly or in combinations of two or more thereof.

<Method for Producing Alumina-Based Thermally Conductive Oxide>

Next, a method for producing the thermally conductive oxide according to the present invention will be described. The method for producing the thermally conductive oxide according to the present invention comprises: a step of mixing an aluminum starting material and an additional starting material, thereby obtaining a starting material mixture (step (1)); and a step of firing the obtained starting material mixture (step (2)). Further, the content of the additional starting material in the starting material mixture is 0.1 to 20 parts by mass based on 100 parts by mass of the aluminum starting material. Hereinafter, the details of the method for producing the thermally conductive oxide according to the present invention will be described.

In the step (1), the aluminum starting material and the additional starting material are mixed. Examples of the method of mixing the aluminum starting material and the additional starting material include a wet process and a dry process. The wet process is a method in which respective components are mixed in water, and the resultant mixture is then filtered, dried, and thereafter fired. The dry method is a method in which respective components are mixed, and the resultant mixture is then fired. The thermally conductive oxide having sufficient physical properties can be obtained through any of the processes. However, in the case where water-soluble additional starting material such as boric acid or a molybdate is used, the additional starting material may be lost during filtration in the wet process, and therefore drying directly a slurry obtained by mixing the respective components in water, or other ways need to be devised. It is to be noted that in the case of the wet process, respective components can be dispersed more uniformly, so that variation in properties and the like among products (thermally conductive oxides) to be obtained becomes small. As can be understood from what is described above, it can be said that the dry process is a method that is suitable for simply producing a larger amount of the thermally conductive oxide and that the wet process is a method that is suitable for producing a high-quality thermally conductive oxide which is more excellent in homogeneity.

In the dry process, respective components are mixed using a device such as a pot mill, a Henschel mixer, an air mix, a conical blender, a planetary ball mill, a vibrating mill, a ribbon mixer, or a vertical blender, and the resultant mixture is then fired. In mixing respective components, mixing may be performed so that the respective components become uniform, and therefore there is no need to pulverize particles of the respective components. In addition, there is also no need to pulverize particles of the respective components in the wet process, and mixing may be performed so that the respective components become uniform.

In the step (2), the starting material mixture obtained in the step (1) is fired at usually 600 to 1,500° C., preferably 1,100 to 1,500° C. By performing firing, the aluminum starting material can be converted to crystallized α-alumina. When the firing temperature is lower than 600° C., the α-alumina structure becomes difficult to form. The coefficient of thermal conductivity of the transition alumina is lower than the coefficient of thermal conductivity of α-alumina, and therefore α-alumina is preferably formed through firing. On the other hand, even though the firing temperature exceeds 1,500° C., the properties of the thermally conductive oxide to be obtained do not change so much, and therefore there is a tendency that the energy consumption is in vain. After the firing, the thermally conductive oxide can be obtained, if necessary, by pulverizing the fired product.

<Thermally Conductive Composition>

A thermally conductive composition according to the present invention comprises: the above-described alumina-based thermally conductive oxide; and a thermally conductive filler. Hereinafter, the details of the thermally conductive composition according to the present invention will be described.

A general filler is added to materials such as a resin, rubber, and a paint for the purpose of improving strength, functionalities, and the like. When the amount of the thermally conductive filler to be blended is increased, the melt fluidity and the mechanical strength of a material such as a resin is usually lowered. In addition, carbon-based fillers have electrical conductivity, and therefore there is a problem that when a carbon-based filler is blended in a resin, the electrical insulation that is an original feature of the resin is liable to be deteriorated. Further, ceramic-based fillers have the electrical insulation but have a problem that the thermal conductivity is low. Examples of the thermally conductive filler include: metal-based fillers such as silver, copper, aluminum, and iron; inorganic fillers such as alumina, magnesia, silica, boronnitride, aluminum nitride, silicon carbide, boron carbide, and titanium carbide; and carbon-based fillers such as diamond, black lead, and graphite. In electronic devices and the like where a high electrical insulation is required, it is considered that fillers such as alumina, magnesium oxide, zinc oxide, silica, boron nitride, aluminum nitride, and diamond are preferable. However, there are many problems in these fillers in terms of water resistance, chemical resistance, hardness, and electrical insulation.

In contrast, the thermally conductive oxide according to the present invention wherein the shortcomings of the above-described various fillers are improved has excellent properties and therefore can be used suitably as an improved filler. Further, the thermally conductive oxide according to the present invention is preferably used together with the above-described various thermally conductive fillers in order to supplement the shortcomings of the existing thermally conductive fillers. That is, the thermally conductive composition according to the present invention comprising: the above-described thermally conductive oxide; and any of the above-described various thermally conductive fillers is a preferred form that can be prepared according to the intended properties.

<Article>

An article according to the present invention is an article (thermally conductive article, thermally conductive material) such as, for example, a gravure ink, a coating liquid, a resin composition, and an adhesive composition, the article comprising the above-described thermally conductive oxide. It is to be noted that if necessary, the article according to the present invention preferably further comprises any of the above-described thermally conductive fillers.

(Gravure Ink)

The thermally conductive oxide according to the present invention can be used by being added to a gravure ink that is used as a topcoat agent for packaging materials for batteries. The content of the thermally conductive oxide in the gravure ink is preferably 5 to 80% by mass, more preferably 10 to 50% by mass based on the whole amount of the gravure ink. By using such a gravure ink (topcoat agent for packaging materials for batteries), a packaging material for batteries which is excellent in chemical resistance such as acid resistance, which has a high coefficient of thermal conductivity, and which has a high thermal emissivity can be prepared.

(Coating Liquid)

The thermally conductive oxide according to the present invention can be used by being added to a coating liquid such as a paint. The coating liquid can also be used as a preparation for coloration obtained by mixing and dispersing: for example, a coloring agent; a resin for forming a film coat or a shaped product; a solvent; and the like together with the thermally conductive oxide in a vehicle. The content of the thermally conductive oxide in the coating liquid is preferably 5 to 80% by mass, more preferably 10 to 70% by mass based on the whole amount of the coating liquid. A coating film or coated, shaped product formed using the coating liquid thus prepared, is excellent in water resistance, chemical resistance, and electrical insulation; retains strength; and is also excellent in thermal conductivity. Further, by forming a thermally conductive thin film on the surface of a member made of a metal such aluminum, copper, silver, gold, or stainless steel using this coating liquid, the thermal emissivity can be improved without lowering the coefficient of thermal conductivity of the metal itself.

Specific examples of the resin that can be contained in the coating liquid include: thermoplastic resins such as polyolefin-based thermoplastic resins, polyester-based thermoplastic resins, polystyrene-based thermoplastic resins, acrylic-based thermoplastic resins, fluorine-based thermoplastic resins, polyamide-based thermoplastic resins, cellulose-based thermoplastic resins, polycarbonate-based thermoplastic resins, and polylactic acid-based thermoplastic resins; and thermosetting resins such as urethane-based thermosetting resins and phenol-based thermoplastic resins.

As the solvent that can be contained in the coating liquid, water and an organic solvent can be used. Specific examples of the organic solvent include methanol, ethanol, butanol, acetone, methyl ethyl ketone, methyl isobutyl ketone, toluene, xylene, butyl acetate, and cyclohexane.

An "additional component" can be selected and contained in the coating liquid appropriately according to the application within a range that does not impair the object of the present invention. Specific examples of the "additional component" include an antioxidizing agent, an ultraviolet absorber, a photo stabilizer, a dispersant, an antistatic agent, a levelling agent, and a germicide.

Examples of the dispersant include: anionic surfactants such as fatty acids and unsaturated fatty acids each comprising a polyvalent carboxylic acid; polymer type ionic surfactants; and phosphoric acid ester-based compounds.

As a method of coating with the coating liquid, conventionally known methods can be adopted. Specific examples include spray coating, brush coating, electrostatic coating, curtain coating, a method using a roll coater, and a method by immersion. In addition, as a method of drying for the purpose of forming a film coat from the applied coating liquid, conventionally known methods can be adopted. Specifically, an air-drying method, a baking method, or the like may be selected and adopted appropriately according to the characteristics of the coating liquid.

By using the coating liquid, a coating film or a coated, shaped product obtained by coating a base material with the coating liquid can be prepared. As the base material, a metal, glass, a natural resin, a synthetic resin, ceramics, wood, paper, fiber, nonwoven fabric, woven fabric, leather, or the like can be selected according to the application. It is to be noted that a coating film to which functionalities are thus imparted can be utilized in various industries such as manufacturing industry, agriculture, mining industry, and fishing industry in addition to home use. In addition, the shape of coating is not limited, and a sheet-like shape, a film-like shape, a plate-like shape, and the like can be selected according to the application.

(Resin Composition)

By blending the thermally conductive oxide according to the present invention in a resin such as a polyamide resin or a polyolefin resin, the resin composition can be prepared. More specifically, by blending the thermally conductive oxide together with additional additives as necessary in a resin, and then mixing the resultant mixture in accordance with a publicly known method, the resin composition can be obtained. Further, by feeding the obtained resin composition into an extrusion molding machine to perform shaping, a given resin-shaped product can be produced. The content of the thermally conductive oxide in the resin composition is preferably 5 to 95% by mass based on the whole amount of the resin composition. By setting the content of the thermally conductive oxide within the above-described range, the resin composition that is more excellent in water resistance, chemical resistance, and electrical insulation; that further retains the strength; and that is more excellent in shapability can be prepared. When the content of the thermally conductive oxide exceeds 95% by mass, the strength and the shapability may be lowered. On the other hand, when the content of the thermally conductive oxide is less than 5% by mass, the thermal conductivity may be insufficient.

The method of adding the thermally conductive oxide to a resin is not particularly limited, and conventionally known methods can be adopted. Examples of the method include a method in which the thermally conductive oxide is directly blended in a resin, and the resultant mixture is then kneaded and processed by shaping, and a method in which a composition (master batch) obtained by dispersing the thermally conductive oxide in a resin or a lubricant at a high concentration in advance is used. As the additional additive, an antioxidizing agent, an ultraviolet preventing agent, an antistatic agent, an antibacterial agent, a stabilizer, a crosslinking agent, a plasticizer, a lubricant, a release agent, a flame retardant, and inorganic fillers such as talc, alumina, clay, and silica. In addition, as a dispersion assistant for the thermally conductive oxide, water, metal soap, polyethylene wax, and the like can be used. Examples of the metal soap include lithium stearate, magnesium stearate, zinc stearate, calcium stearate, magnesium palmitate, calcium oleate, and cobalt oleate. Examples of the polyethylene wax include various types of polyethylene wax such as general polymerization type polyethylene wax, decomposition type polyethylene wax, and modified type polyethylene wax.

It is to be noted that in the above-described coating liquid or resin composition, various types of organic pigments and inorganic pigments can also be blended as a coloring agent. Example of the coloring agent include: organic pigments such as phthalocyanine-based pigments, azo-based pigments, azomethine-based pigments, isoindolinone-based pigments, quinacridone-based pigments, anthraquinone-based pigments, dioxazine-based pigments, and perinone/perylene-based pigments; complex oxide-based pigments each having a color other than black; titanium oxide-based pigments such as titanium oxide-based white pigments, titanium oxide-based yellow pigments, and titanium oxide-based black pigments; and inorganic pigments such as carbon black, ultramarine blue, and Bengala. In addition, examples of the phthalocyanine-based pigments include brominated phthalocyanine blue pigments and phthalocyanine green pigments. Further, examples of the azo-based pigments include polycondensed azo-based pigments and azomethine azo-based pigments.

Further, the resin composition can also be obtained by melt-kneading using an extrusion molding machine or the like a master batch compound obtained by blending the thermally conductive oxide, various pigments, the additives, and the like in a resin for a compound. More specifically, the resin composition can be obtained by (i) blending the thermally conductive oxide and a dispersion assistant in a resin for a compound, adding additional additives as necessary, and then mixing the resultant mixture using a mixer such as a Henschel mixer; (ii) kneading the master batch compound using a kneader or a heating two-roll mill, and thereafter cooling and then pulverizing the kneaded master batch compound into a coarse powder; (iii) feeding the master batch compound into an extrusion molding machine to be subjected to extrusion molding into a bead-like shape, a columnar shape, or the like; or other methods. The method of shaping is not particularly limited, and, for example, an injection molding method, an extrusion molding method, heat-compression molding method, a blow molding method, an inflation molding method, a vacuum forming method, or the like may be adopted.

(Adhesive Composition)

The thermally conductive oxide according to the present invention can be used as an adhesive composition by being added to an adhesive. The type of the resin contained in the adhesive is not particularly limited as long as the resin is a resin having an adhesive property, such as a urethane-based resin, an epoxy-based resin, a vinyl acetate resin, or acrylic-based resin. In addition, the adhesion mechanism is not limited, and any of chemical reaction type, solvent evaporation type, thermal fusion type, and thermal pressure type mechanism may be used. The content of the thermally conductive oxide in the adhesive composition is preferably 5 to 80% by mass, more preferably 10 to 50% by mass based on the whole amount of the adhesive composition. By setting the content of the thermally conductive oxide within the above-described range, the adhesive composition that is more excellent in thermal conductivity, adhesive properties, water resistance, chemical resistance, and electrical insulation can be prepared. When the content of the thermally conductive oxide exceeds 80% by mass, the adhesion strength may be insufficient. On the other hand, when the content of the thermally conductive oxide is less than 5% by mass, the thermal conductivity may be insufficient.

Thermally conductive articles and thermally conductive materials such as the above-described gravure ink, coating liquid, resin composition, and adhesive composition are produced using the thermally conductive oxide according to the present invention, and by using the thermally conductive articles and the thermally conductive materials, the thermally conductive oxide according to the present invention can also be used as an electronic device that has a heat-dissipating property (thermal conductivity) and has excellent chemical resistance, water resistance, and electrical insulation. More specifically, the thermally conductive oxide according to the present invention can be utilized as a metallic circuit board, a circuit board, a metallic laminated board, an inner layer-containing metal-clad laminate, a packaging material for batteries, a sealant, a protective sheet, and the like. Further, the thermally conductive oxide according to the present invention can be used as an adhesive sheet, a heat dissipation sheet, a heat dissipation coating agent, a semiconductor sealant, an adhesive, a heat dissipation spacer, grease, and the like.

<Liquid Composition>

A liquid composition according to the present invention is a liquid composition to be used for forming a thermally conductive thin film, and comprises: a thermally conductive component comprising the above-described alumina-based thermally conductive oxide; a resin for forming a film; and a solvent.

(Thermally Conductive Component)

In the thermally conductive component, the above-described alumina-based thermally conductive oxide is contained. Moreover, the thermally conductive component preferably further comprises at least one selected from barium sulfate, talc, and boron nitride. By using a component such as barium sulfate together with the alumina-based thermally conductive oxide, the thin film having a more excellent thermal conductivity can be formed.

The amount of the thermally conductive component in the liquid composition is preferably 20 to 200 parts by mass, more preferably 50 to 150 parts by mass based on 100 parts by mass of the resin for forming a film. When the content of the thermally conductive component is less than 20 parts by mass, the thermal conductivity of the thin film to be formed may be insufficient. On the other hand, when the content of the thermal conductive component exceeds 200 parts by mass, the content of the resin for forming a film is increased relatively, and therefore there is a tendency that the film-forming property is lowered, and the adhesiveness of the thin film to be formed to a base material is lowered.

(Resin for Forming Film)

As the resin for forming a film, a resin that enables to form a film and that is soluble in a solvent (solvent-soluble resin) can be used. As such a solvent-soluble resin, at least one selected from the group consisting of an acrylic-based resin, a urethane-based resin, a urea-based resin, an epoxy-based resin, a rubber-based resin, a fluorine-based resin, a polyamide-based resin, a polyimide-based resin, a cellulose-based resin, a silicone-based resin, and a thermoplastic elastomer can be used.

Examples of the acrylic-based resin include acrylic silicone-based resins, acrylic fluorine-based resins, poly(methyl methacrylate) (PMMA), poly(ethyl methacrylate), poly(methyl acrylate), poly(ethyl acrylate), and poly(hydroxy methacrylate).

Examples of the urethane-based resin include urethane resins such as ether-based urethane resins, ester-based urethane resins, carbonate-based urethane resins, acrylic-based urethane resins, and aliphatic-based urethane resins; and resins obtained by copolymerizing a silicone-based polyol or a fluorine-based polyol with any of these urethane resins. It is to be noted that a urea bond or an imide bond may be contained in the molecular structure of the urethane-based resin, and the solvent may be water or an organic solvent.

The urea-based resin may be a resin having a urea bond in the molecular structure thereof, and examples thereof include urethane urea elastomers, melamine resins, and urea formaldehyde resins.

Examples of the epoxy-based resin include bisphenol A type epoxy resins, novolak type epoxy resins, brominated epoxy resins, polyglycol type epoxy resins, polyamide-containing type epoxy resins, silicone-modified epoxy resins, amino resin-containing type epoxy resins, and alkyd resin-containing type epoxy resins.

Examples of the rubber-based resin include natural rubber (NR), butadiene rubber (BR), acrylonitrile-butadiene rubber (NBR), hydrogenated NBR (H-NBR), styrene butadiene rubber (SBR), isoprene rubber (IR), urethane rubber, chloroprene rubber (CR), epichlorohydrin rubber (ECO), ethylene-propylene-diene polymer (EPDM), acrylic rubber (ACM), chlorosulfonated polyethylene (CSM), polysulfide rubber, and fluororubber.

Examples of the fluorine-based resin include polyvinylidene fluoride (PVDF), vinylidene fluoride-tetrafluoroethylene copolymers, and vinylidene fluoride-tetrafluoroethylene-hexafluoropropylene copolymers.

Examples of the polyamide-based resin include alcohol-soluble methoxymethylated nylon. Examples of the polyimide-based resin include polyamide imide (PAI), polyamic acid, and silicone imide.

Examples of the cellulose resin include: cellulose esters such as cellulose diacetate, cellulose triacetate, cellulose propionate, and cellulose acetate propionate; and cellulose ethers such as methyl cellulose, hydroxyethyl cellulose, hydroxypropyl cellulose, hydroxypropyl methyl cellulose, and carboxymethyl cellulose.

Examples of the thermoplastic elastomer include styrene-based thermoplastic elastomers such as styrene-butadiene-styrene block copolymers (SBS), styrene-isoprene-styrene block copolymers (SIS), styrene-ethylene/butylene-styrene block copolymers (SEBS), and styrene-ethylene/propylene-styrene block copolymers (SEPS); urethane-based thermoplastic elastomers (TPU); olefin-based thermoplastic elastomers (TPO); polyester-based thermoplastic elastomers (TPEE); polyamide-based thermoplastic elastomers; fluorine-based thermoplastic elastomers; and vinyl chloride-based thermoplastic elastomers.

(Solvent)

The solvent may be a general solvent that is used for a coating agent for forming a thin film made of a resin. As the solvent, water, or organic solvents such as aromatic-based solvents, hydrocarbon-based solvents, alcohol-based solvents, glycol derivatives, ketone-based solvents, halogen-based solvents, ester-based solvents, ether-based solvents, and nitrogen-containing solvents can be used. These solvents can be used singly or in combinations of two or more thereof.

Examples of the aromatic-based solvents include benzene, toluene, xylene, mesitylene, ethylbenzene, propylbenzene, butylbenzene, pentylbenzene, hexylbenzene, nonylbenzene, decylbenzene, undecylbenzene, dodecylbenzene, tetralin, and cyclohexylbenzene. Examples of the hydrocarbon-based solvents include straight-chain or branched-chain, saturated or unsaturated hydrocarbon-based solvents having 6 or more carbon atoms such as hexane, heptane, octane, nonane, decane and undecane.

Examples of the alcohol-based solvents include methanol, ethanol, propanol, isopropanol, butanol, isobutanol, hexanol, cyclohexanol, benzyl alcohol, ethylene glycol, propylene glycol, diethylene glycol, dipropylene glycol, polyethylene glycol, polypropylene glycol, triethylene glycol, tetraethylene glycol, tripropylene glycol, 1,2-butanediol, 1,3-butanediol, 1,4-butanediol, and 1,4-butenediol.

Examples of the glycol derivatives include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, and ethylene glycol monomethyl ether acetate. Examples of the ketone-based solvents include acetone, methyl ethyl ketone, methyl isobutyl ketone, cyclohexanone, and methylcyclohexanone.

Examples of the halogen-based solvents include dichloromethane, dichloroethane, chloroform, carbon tetrachloride, tetrachloroethane, trichloroethane, chlorobenzene, dichlorobenzene, and chlorotoluene. Examples of the ester-based solvents include 2-methoxybutyl acetate, 3-methoxybutyl acetate, 4-methoxybutyl acetate, 2-methyl-3-methoxybutyl acetate, 3-methyl-3-methoxybutyl acetate, 3-ethyl-3-methoxybutyl acetate, 2-ethoxybutyl acetate, 4-ethoxybutyl acetate, 4-propoxybutyl acetate, 2-methoxypentyl acetate, 3-methoxypentyl acetate, 4-methoxypentyl acetate, 2-methyl-3-methoxypentyl acetate, 3-methyl-3-methoxypentyl acetate, 3-methyl-4-methoxypentyl acetate, 4-methyl-4-methoxypentyl acetate, methyl lactate, ethyl lactate, methyl acetate, ethyl acetate, propyl acetate, butyl acetate, amyl acetate, methyl propionate, ethyl propionate, methyl benzoate, ethyl benzoate, propyl benzoate, butyl benzoate, methyl butyrate, ethyl butyrate, and propyl butyrate.

Examples of the ether-based solvents include dibutyl ether, tetrahydrofuran, dioxane, anisole, and 3-phenoxytoluene. Examples of the nitrogen-containing solvents include N-methylformamide, N-ethylformamide, N,N-dimethylformamide, N,N-diethylformamide, acetamide, N-methylacetamide, N-ethylacetamide, N,N-dimethylacetamide, N,N-diethylacetamide, N-methylpyrrolidone, N-ethylpyrrolidone, N-propylpyrrolidone, N-vinylpyrrolidone, N,N'-dimethyl imidazolidinone, γ-butyrolactam, and ε-caprolactam.

The amount of the solvent in the liquid composition is not particularly limited and may be set appropriately according to the application. The amount of the solvent in the liquid composition is usually 1 to 90% by mass, preferably 10 to 80% by mass.

In addition, a thin film that is excellent in thermal conductivity can be formed by adding a urethane-based resin such as an aqueous polyurethane resin to the liquid composition, and then curing the urethane-based resin. The thermally conductive thin film thus formed can be used, for example, as a heat dissipation sheet for electronic devices.

<Thermally Conductive Thin Film>

A thermally conductive thin film according to the present invention is formed through coating with the above-described liquid composition. As described above, the thermally conductive component comprising an alumina-based thermally conductive oxide is contained in the liquid composition. Therefore, the thermally conductive thin film according to the present invention formed using the liquid composition is not only excellent in thermal conductivity and chemical resistance but also excellent in adhesiveness to various base materials. It is to be noted that the thermally conductive component comprising an alumina-based thermally conductive oxide is dispersed in a thin resin layer formed by a resin for forming a film, and thereby the thermally conductive thin film according to the present invention is usually formed.

To form the thermally conductive thin film according to the present invention, for example, the liquid composition is applied on a desired base material, or a base material is impregnated with the liquid composition. Thereby, a coating film composed of the liquid composition can be formed on the surface of the base material. Thereafter, by drying the coating film, the thermally conductive thin film can be formed. As the method of applying (impregnating the base material with) the liquid composition, general methods such as, for example, a printing method, a blade coating method, a (Meyer) bar coating method, a spray coating method, an immersion coating method, a bead coating method, an air knife coating method, a curtain coating method, and a roll coating method can be adopted. Drying the coating film may be performed by air drying or thermal drying. By performing the thermal drying, the coating film can be dried easily to form the thermally conductive thin film. As the drying method, general methods such as, for example, a method of putting the coating film into an oven, a method of allowing the coating film to pass through the inside of an oven, and a method of bringing the coating film into contact with a heating roller can be adopted.

By disposing the thermally conductive thin film according to the present invention, for example, on the surface of an electronic part or the like which is liable to generate heat in a lithium secondary battery, the generated heat can be transmitted outside easily to be dissipated. Moreover, the thermally conductive thin film according to the present invention can be formed easily by applying and drying the liquid composition, or by other methods, and therefore is advantageous in terms of production cost. The thermally conductive thin film according to the present invention is preferably disposed particularly on the surface of an exterior material that constitutes a lamination type lithium secondary battery.

The exterior material that constitutes the lamination type lithium secondary battery (exterior material for lithium secondary battery) is formed, for example, in such a way that heat-sealable base material films such as sealant layers, aluminum foils, and PET films are laminated, if necessary, in a state where an adhesive layer is interposed therebetween. Further, when the thermally conductive thin film according to the present invention is disposed on the surface of the base material film, the heat generated from the battery main body disposed on the sealant layer side can be transmitted outside to be dissipated.

The thermally conductive film according to the present invention is excellent in adhesiveness to the surface of a metal such as aluminum, copper, silver, gold, and stainless steel. Moreover, by disposing the thermally conductive thin film on the surface of any of these metallic members so as to be in close contact with the surface, the thermal emissivity can be improved without lowering the coefficient of thermal conductivity of the metal itself. Therefore, by disposing the thermally conductive thin film according to the present invention on the surface of the member made of a metal such as aluminum, copper, silver, gold, and stainless steel, a member for an electronic device such as a heat sink can be prepared. It is to be noted that the thermally conductive thin film can be formed easily by coating the surface of the metallic member with the above-described liquid composition, and then performing drying, and therefore is also advantageous in terms of production cost.

EXAMPLES

Hereinafter, the present invention will be described specifically based on Examples, but the present invention is not limited to Examples. It is to be noted that "part(s)" and "%" in Examples and Comparative Examples are on a mass basis unless otherwise noticed.

<Aluminum Starting Material>

The following aluminum starting materials were used.

Boehmite: spherical shape, number average particle diameter of 7 μm

Aluminum hydroxide A: spherical shape, number average particle diameter of 6.5 μm Aluminum hydroxide B: spherical shape, number average particle diameter of 10 μm α-Alumina: spherical shape, number average particle diameter of 20 μm γ-Alumina: spherical shape, number average particle diameter of 17 μm <Additional Starting Material>

Among additional starting materials, the following frits and talc were used.

Frit A: comprising Na, K, B, Si, Al, F, and P as main components and having a softening point of 450° C.

Frit B: comprising B, Si, Mg, and Al as main components and having a softening point of 650° C.

Frit C: comprising B, Si, Na, K, Ti, and F as main components and having a softening point of 530° C.

Talc: spherical shape, number average particle diameter of 2 μm

<Production of Thermally Conductive Oxide (1)>

Example 1

The boehmite in an amount of 100 parts and the frit A in an amount of 1 part were put into a small-sized mixer, and stirred and mixed to obtain a starting material mixture. The obtained starting material mixture was fired at 1,200° C. for 3 hours in air, and the fired product was then pulverized to obtain a powdered thermally conductive oxide.

Examples 2 to 15, 17 to 24, and 26 to 72, and Comparative Example 10

Powdered thermally conductive oxides were obtained in the same manner as in Example 1 described above except that the types and amounts of the aluminum starting materials and additional starting materials shown in Tables 1-1 to 1-3 were used.

Example 16

The aluminum hydroxide A in an amount of 100 parts was put into 200 parts of water, and then stirred using a disper. The talc in an amount of 1 part was put into the mixture, and the resultant mixture was further stirred for 30 minutes to obtain a slurry. The obtained slurry was subjected to filtration to be dried, and then fired at 1,200° C. for 3 hours in air to obtain a powdered thermally conductive oxide.

Example 25

The α-alumina in an amount of 100 parts was put into 200 parts of water, and then stirred using a disper. The talc in an amount of 1 part was put into the mixture, and the resultant mixture was further stirred for 30 minutes to obtain a slurry. The obtained slurry was subjected to filtration to be dried, and then fired at 1,200° C. for 3 hours in air to obtain a powdered thermally conductive oxide.

Comparative Example 1

A powder obtained by firing the boehmite at 1,200° C. for 2 hours in air was used as a sample of Comparative Example 1.

Comparative Example 2

A powder obtained by firing the aluminum hydroxide A at 1,200° C. for 2 hours in air was used as a sample of Comparative Example 2.

Comparative Examples 3 to 9

The substances described in Table 1-3 were each used as a sample of Comparative Examples 3 to 9.

TABLE 1-1

| | Aluminum starting material | | Additional starting material | | |
|---|---|---|---|---|---|
| | Type | Amount (parts) | Type | Amount (parts) | Production method |
| Example 1 | Boehmite | 100 | Frit A | 1 | Dry process |
| Example 2 | Boehmite | 100 | Frit A | 5 | Dry process |
| Example 3 | Boehmite | 100 | Boric acid | 1 | Dry process |
| Example 4 | Boehmite | 100 | Boric acid | 5 | Dry process |
| Example 5 | Boehmite | 100 | Lithium borate | 1 | Dry process |
| Example 6 | Boehmite | 100 | Ammonium molybdate | 1 | Dry process |
| Example 7 | Boehmite | 100 | Ammonium molybdate | 5 | Dry process |
| Example 8 | Boehmite | 100 | Sodium tungstate | 5 | Dry process |
| Example 9 | Aluminum hydroxide A | 100 | Frit A | 1 | Dry process |
| Example 10 | Aluminum hydroxide A | 100 | Frit A | 5 | Dry process |
| Example 11 | Aluminum hydroxide A | 100 | Boric acid | 1 | Dry process |
| Example 12 | Aluminum hydroxide A | 100 | Boric acid | 5 | Dry process |
| Example 13 | Aluminum hydroxide A | 100 | Boric acid | 10 | Dry process |
| Example 14 | Aluminum hydroxide A | 100 | Lithium borate | 1 | Dry process |
| Example 15 | Aluminum hydroxide A | 100 | Lithium borate | 5 | Dry process |
| Example 16 | Aluminum hydroxide A | 100 | Talc | 1 | Wet process |
| Example 17 | Aluminum hydroxide A | 100 | Talc | 1 | Dry process |
| Example 18 | Aluminum hydroxide A | 100 | Ammonium molybdate | 1 | Dry process |
| Example 19 | Aluminum hydroxide A | 100 | Ammonium molybdate | 5 | Dry process |
| Example 20 | Aluminum hydroxide A | 100 | Sodium tungstate | 0.3 | Dry process |
| Example 21 | Aluminum hydroxide A | 100 | Sodium tungstate | 5 | Dry process |
| Example 22 | Aluminum hydroxide A | 100 | Frit C | 1 | Dry process |
| Example 23 | Aluminum hydroxide A | 100 | Frit C | 5 | Dry process |
| Example 24 | Aluminum hydroxide A | 100 | Ammonium phosphomolybdate | 0.5 | Dry process |
| Example 25 | α-Alumina | 100 | Talc | 1 | Wet process |
| Example 26 | α-Alumina | 100 | Frit A | 0.3 | Dry process |
| Example 27 | α-Alumina | 100 | Boric acid | 0.3 | Dry process |
| Example 28 | α-Alumina | 100 | Lithium borate | 0.5 | Dry process |
| Example 29 | α-Alumina | 100 | Lithium borate | 1 | Dry process |
| Example 30 | α-Alumina | 100 | Ammonium molybdate | 0.3 | Dry process |
| Example 31 | α-Alumina | 100 | Ammonium molybdate | 2 | Dry process |
| Example 32 | α-Alumina | 100 | Sodium tungstate | 1 | Dry process |
| Example 33 | α-Alumina | 100 | Sodium tungstate | 2 | Dry process |

TABLE 1-2

| | Aluminum starting material | | Additional starting material | | |
|---|---|---|---|---|---|
| | Type | Amount (parts) | Type | Amount (parts) | Production method |
| Example 34 | Aluminum hydroxide B | 100 | Talc | 1 | Dry process |
| Example 35 | Aluminum hydroxide B | 100 | Talc | 5 | Dry process |

TABLE 1-2-continued

|  | Aluminum starting material | | Additional starting material | | |
|---|---|---|---|---|---|
|  | Type | Amount (parts) | Type | Amount (parts) | Production method |
| Example 36 | Aluminum hydroxide B | 100 | Frit A | 1 | Dry process |
| Example 37 | Aluminum hydroxide B | 100 | Frit A | 5 | Dry process |
| Example 38 | Aluminum hydroxide B | 100 | Boric acid | 1 | Dry process |
| Example 39 | Aluminum hydroxide B | 100 | Boric acid | 5 | Dry process |
| Example 40 | Aluminum hydroxide B | 100 | Ammonium molybdate | 1 | Dry process |
| Example 41 | Aluminum hydroxide B | 100 | Ammonium molybdate | 2 | Dry process |
| Example 42 | Aluminum hydroxide B | 100 | Ammonium molybdate | 4 | Dry process |
| Example 43 | Aluminum hydroxide B | 100 | Frit B | 1 | Dry process |
| Example 44 | Aluminum hydroxide B | 100 | Frit B | 5 | Dry process |
| Example 45 | Aluminum hydroxide B | 100 | Titanium oxide | 1 | Dry process |
| Example 46 | Aluminum hydroxide B | 100 | Titanium oxide | 3 | Dry process |
| Example 47 | Aluminum hydroxide B | 100 | Magnesium oxide | 3 | Dry process |
| Example 48 | Aluminum hydroxide B | 100 | Magnesium oxide | 20 | Dry process |
| Example 49 | Aluminum hydroxide B | 100 | Zinc oxide | 3 | Dry process |
| Example 50 | Aluminum hydroxide B | 100 | Zinc oxide | 20 | Dry process |
| Example 51 | Aluminum hydroxide B | 100 | Zirconium oxide | 3 | Dry process |
| Example 52 | Boehmite | 100 | Frit B | 5 | Dry process |
| Example 53 | γ-Alumina | 100 | Frit A | 2 | Dry process |
| Example 54 | γ-Alumina | 100 | Boric acid | 1 | Dry process |
| Example 55 | γ-Alumina | 100 | Ammonium molybdate | 2 | Dry process |
| Example 56 | γ-Alumina | 100 | Sodium tungstate | 2 | Dry process |
| Example 57 | Boehmite | 100 | Talc<br>Boric acid | 5<br>1 | Dry process |
| Example 58 | Boehmite | 100 | Frit A<br>Boric acid | 3<br>1 | Dry process |
| Example 59 | Boehmite | 100 | Frit B<br>Boric acid | 3<br>1 | Dry process |
| Example 60 | Boehmite | 100 | Frit B<br>Ammonium molybdate | 3<br>1 | Dry process |

TABLE 1-3

|  | Aluminum starting material | | Additional starting material | | |
|---|---|---|---|---|---|
|  | Type | Amount (parts) | Type | Amount (parts) | Production method |
| Example 61 | Aluminum hydroxide A | 100 | Talc<br>Boric acid | 10<br>2 | Dry process |
| Example 62 | Aluminum hydroxide A | 100 | Talc<br>Boric acid | 5<br>1 | Dry process |
| Example 63 | Aluminum hydroxide A | 100 | Frit A<br>Boric acid | 1<br>1 | Dry process |
| Example 64 | Aluminum hydroxide A | 100 | Frit A<br>Boric acid | 1<br>3 | Dry process |
| Example 65 | Aluminum hydroxide A | 100 | Frit A<br>Boric acid | 3<br>1 | Dry process |
| Example 66 | Aluminum hydroxide A | 100 | Frit B<br>Boric acid | 1<br>1 | Dry process |
| Example 67 | Aluminum hydroxide A | 100 | Frit B<br>Boric acid | 1<br>3 | Dry process |
| Example 68 | Aluminum hydroxide A | 100 | Frit B<br>Boric acid | 3<br>1 | Dry process |
| Example 69 | Aluminum hydroxide A | 100 | Frit B<br>Ammonium molybdate | 1<br>1 | Dry process |
| Example 70 | Aluminum hydroxide A | 100 | Boric acid<br>Ammonium molybdate | 1<br>1 | Dry process |
| Example 71 | α-Alumina | 100 | Talc<br>Boric acid | 2<br>0.5 | Dry process |
| Example 72 | α-Alumina | 100 | Frit B<br>Ammonium molybdate | 1<br>1 | Dry process |
| Comparative Example 1 | Boehmite (1,200° C. × 2 hours fired product) | | | | |
| Comparative Example 2 | Aluminum hydroxide A (1,200° C. × 2 hours fired product) | | | | |
| Comparative Example 3 | γ-Alumina (commercially available product, average particle diameter of 15 μm) | | | | |
| Comparative Example 4 | α-Alumina (commerically available product, average particle diameter of 20 μm) | | | | |
| Comparative Example 5 | α-Alumina (commercially available product, average particle diameter of 3 μm) | | | | |
| Comparative Example 6 | Boron nitride (commercially available product, average particle diameter of 18 μm) | | | | |
| Comparative Example 7 | Zinc oxide (commercially available product, average particle diameter of 20 μm) | | | | |
| Comparative Example 8 | Magnesium oxide (commerically available product, average particle diameter of 20 μm) | | | | |
| Comparative Example 9 | Aluminum nitride (commercially available product, average particle diameter of 19 μm) | | | | |
| Comparative Example 10 | Aluminum hydroxide A | 100 | Ammonium molybdate | 25 | Dry process |

<Evaluation (1)>
(Preparation of Shaped Body A for Evaluation)

A resin composition obtained by mixing 50 parts of polypropylene (manufactured by Prime Polymer Co., Ltd., MFR of 20 g/10 min) and 50 parts of the thermally conductive oxide was placed in a plastomill and was then melt-kneaded under a condition of a preset temperature of 200° C. Subsequently, the melt-kneaded product was subjected to metallic mold pressing under a condition of 175° C. to prepare a shaped body A for evaluation.

(Preparation of Shaped Body B for Evaluation)

A resin composition obtained by mixing 30 parts of polypropylene (manufactured by Prime Polymer Co., Ltd., MFR of 20 g/10 min) and 70 parts of the thermally conductive oxide was placed in a plastomill and was then melt-kneaded under a condition of a preset temperature of 200° C. Subsequently, the melt-kneaded product was subjected to metallic mold pressing under a condition of 175° C. to prepare a shaped body B for evaluation.

(Chemical Resistance)

The shaped body B was cut out to obtain a test piece having a size of 40 mm×40 mm×1 mm in thickness. The obtained test piece was immersed in 5% hydrochloric acid, a 5% aqueous sulfuric acid solution, a 5% aqueous nitric acid solution, and a 5% aqueous sodium hydroxide solution in the mentioned order in such a way that the test piece immersed in each solution was stirred once every day and left to stand for 1 week in each solution. The mass of the test piece before the immersion and the mass of the test piece after the immersion were measured, and a rate (%) of a change in the mass based on the mass of the test piece before the immersion was calculated to evaluate the chemical resistance according to the evaluation criteria described below. The results are shown in Table 2.

Good: rate of change in mass of less than 2%
Poor: rate of change in mass of 2% or more
(Water Resistance)

The shaped body B for evaluation was cut out to prepare a test piece having a size of 40 mm×40 mm×1 mm in thickness. The obtained test piece was left to stand under an atmosphere of a temperature of 70° C. and a relative humidity of 90% for 8 days, water adhered to the surface of the test piece was then wiped off, and the test piece was thereafter left to stand under an atmosphere of a temperature of 28° C. and a relative humidity of 50% for 3 hours. Further, the test piece was retained in an autoclave of 121° C., 2 atm, and a relative humidity of 100% for 120 hours. The withstand voltage of the test piece before and after the treatment were measured, and a rate (%) of lowering in the withstand voltage based on the withstand voltage of the test piece before the treatment was calculated to evaluate the water resistance according to the evaluation criteria described below. The results are shown in Table 2.

Good: rate of lowering in withstand voltage of less than 10%
Fair: rate of lowering in withstand voltage of 10% or more and less than 50%
Poor: rate of lowering in withstand voltage of 50% or more
(Electrical Insulation)

The thermally conductive oxide was filled in an aluminum ring, and press molding (20 MPa) was performed with an oil hydraulic press to prepare a sample for measurement. The volume electrical resistivity value of the prepared sample for measurement was measured using an electrical resistivity meter to evaluate the electrical insulation according to the evaluation criteria described below. The results are shown in Table 2.

Excellent: volume electrical resistivity value of $10^{10}$ Ω·cm or more
Good: volume electrical resistivity value of $10^5$ Ω·cm or more and less than $10^{10}$ Ω·cm
Fair: volume electrical resistivity value of 10 Ω·cm or more and less than $10^5$ Ω·cm
Poor: volume electrical resistivity value of less than 10 Ω·cm (Wettability)

A dispersion liquid was obtained by mixing 50 parts of a polyol (trade name "KURARAY POLYOL P-1010", manufactured by KURARAY CO., LTD., viscosity (25° C.) of 1,500 kPa·s) and 50 parts of the thermally conductive oxide. The solution viscosity (25° C., number of revolutions of 0.5 rpm) of the obtained dispersion liquid was measured using an E type rotational viscometer to evaluate the wettability of the thermally conductive oxide to a resin according to the evaluation criteria described below. The results are shown in Table 2.

Excellent: solution viscosity of 2,000 mPa·s or more and less than 5,000 mPa·s
Good: solution viscosity of 5,000 mPa·s or more and less than 15,000 mPa·s
Fair: solution viscosity of 15,000 mPa·s or more and less than 25,000 mPa·s
Poor: solution viscosity of 25,000 mPa·s or more
(Shapability)

The abrasiveness of the machine in preparing the shaped body B for evaluation, and the surface state of the prepared shaped body B for evaluation were observed to evaluate the shapability according to the evaluation criteria described below. The results are shown in Table 2.

The shapability was determined according to the following criteria.

Good: no problem occurs in the abrasiveness and the surface state
Fair: a problem occurs in either the abrasiveness or the surface state
Poor: a problem occurs in both the abrasiveness and the surface state
(Measurement of Mohs Hardness)

The thermally conductive oxide was disposed between smooth surfaces of a mineral whose Mohs hardness is already known to rub the thermally conductive oxide and the smooth surfaces of the mineral, and then the states of the smooth surfaces of the mineral were observed to measure the Mohs hardness of the thermally conductive oxide. The results are shown in Table 2.

(Measurement of Coefficient of Thermal Conductivity)

A resin composition obtained by mixing 30 parts of polypropylene (manufactured by Prime Polymer Co., Ltd., MFR of 20 g/10 min) and 70 parts of the thermally conductive oxide was placed in a plastomill and was then melt-kneaded under a condition of a preset temperature of 200° C. Subsequently, the melt-kneaded product was subjected to metallic mold pressing using a metallic mold of 20 mm in length×20 mm in width×6 mm in height under a condition of 175° C. to prepare a test piece. The coefficient of thermal conductivity of the prepared test piece was measured using a thermophysical property-measuring apparatus (trade name "TPS-2500S", manufactured by Kyoto Electronics Manufacturing Co., Ltd.). The results are shown in Table 2.

(Measurement of Dielectric Breakdown Voltage)

The shaped body B for evaluation was cut out to obtain a test piece having a size of 100 mm×100 mm×1 mm in thickness. The obtained test piece was immersed in oil to measure the dielectric breakdown voltage under conditions of an alternating current of 10 mA and a rate of rise of voltage of 2 kV/sec in accordance with JIS K6911 and C2110-1. The value of the dielectric breakdown strength (kV/mm) obtained by diving the measured value of the dielectric breakdown voltage by the thickness (mm) of the test piece is shown in Table 3.

TABLE 2

|  | Chemical resistance | Water resistance | Electrical insulation | Wettability | Shapability | Mohs hardness | Coefficient of thermal conductivity (W/mK) |
| --- | --- | --- | --- | --- | --- | --- | --- |
| Example 1 | Good | Good | Good | Excellent | Good | 6 | 1.12 |
| Example 3 | Good | Good | Good | Excellent | Good | 6 | 1.16 |
| Example 5 | Good | Good | Good | Excellent | Good | 6 | 1.12 |
| Example 9 | Good | Good | Good | Good | Good | 5 | 1.18 |
| Example 11 | Good | Good | Good | Good | Good | 5 | 1.21 |
| Example 13 | Good | Good | Good | Good | Good | 5 | 1.08 |
| Example 14 | Good | Good | Good | Good | Good | 5 | 1.17 |
| Example 16 | Good | Good | Good | Good | Good | 6 | 1.27 |
| Example 18 | Good | Good | Good | Good | Good | 5 | 1.17 |
| Example 20 | Good | Good | Good | Good | Good | 6 | 1.37 |
| Example 22 | Good | Good | Good | Good | Good | 6 | 1.19 |
| Example 25 | Good | Good | Good | Excellent | Good | 7 | 1.05 |
| Example 26 | Good | Good | Good | Excellent | Good | 7 | 1.12 |
| Example 29 | Good | Good | Good | Excellent | Good | 7 | 1.08 |
| Example 37 | Good | Good | Good | Excellent | Good | 5 | 1.19 |
| Example 46 | Good | Good | Good | Good | Good | 7 | 1.28 |
| Example 47 | Good | Good | Good | Good | Good | 7 | 1.01 |
| Example 48 | Good | Good | Good | Excellent | Good | 5 | 1.33 |
| Example 49 | Good | Good | Good | Excellent | Good | 4 | 1.00 |
| Example 50 | Good | Good | Good | Good | Good | 5 | 1.25 |
| Example 61 | Good | Good | Good | Good | Good | 5 | 1.07 |
| Example 65 | Good | Good | Good | Good | Good | 6 | 1.23 |
| Example 66 | Good | Good | Good | Good | Good | 5 | 1.17 |
| Example 68 | Good | Good | Good | Excellent | Good | 5 | 1.20 |
| Comparative Example 1 | Good | Good | Good | Poor | Poor | 9 | 0.95 |
| Comparative Example 2 | Good | Good | Good | Fair | Fair | 9 | 1.37 |
| Comparative Example 3 | Good | Good | Good | Poor | Poor | 9 | 0.78 |
| Comparative Example 4 | Good | Good | Good | Excellent | Fair | 9 | 0.86 |
| Comparative Example 5 | Good | Good | Good | Excellent | Fair | 9 | 0.80 |
| Comparative Example 6 | Good | Good | Good | Poor | Fair | 2 | 2.66 |
| Comparatibe Example 7 | Poor | Poor | Fair | Excellent | Good | 5 | 0.95 |
| Comparative Example 8 | Poor | Poor | Good | Excellent | Good | 6 | 1.18 |
| Comparative Example 9 | Poor | Poor | Fair | Excellent | Fair | 8 | 1.41 |
| Comparative Example 10 | Good | Good | Good | Excellent | Fair | 6 | 0.92 |

TABLE 3

|  | Dielectric breakdown strength (kV/mm) |
| --- | --- |
| Comparative Example 4 | 30 |
| Example 9 | 32 |
| Example 38 | 31 |
| Example 69 | 35 |

<Preparation and Evaluation of Coating Liquid>

A coating liquid was prepared by mixing 15 parts of the thermally conductive oxide of Example 11, 62 parts of a urethane-based resin having a viscosity of 3,500 mPa·s, and 23 parts of ethyl acetate, and then dispersing the resultant mixture using a paint shaker, and further, two coating liquids were prepared in the same manner as described above except that the thermally conductive oxide of Comparative Example 5 was used in place of the thermally conductive oxide of Example 11 in one coating liquid, and the thermally conductive oxide of Comparative Example 7 was used in place of the thermally conductive oxide of Example 11 in the other coating liquid. Each prepared coating liquid was applied on release paper uniformly using a glass rod, and then the release paper was placed in an oven of 100° C. for 2 minutes to evaporate the solvent component, thereby forming a coating film having a thickness of 50 μm. The coefficient of thermal conductivity and the thermal emissivity of the coating film were measured to find that the coating film formed using the α-alumina of Comparative Example 5 had a coefficient of thermal conductivity of 0.28 W/mK and a thermal emissivity of 0.88. In addition, the coating film formed using the zinc oxide of Comparative Example 7 had a coefficient of thermal conductivity of 0.18 W/mK and a thermal emissivity of 0.88. In contrast, the coating film formed using the thermally conductive oxide of Example 11 had a coefficient of thermal conductivity of 0.37 W/mK and a thermal emissivity of 0.93. It is considered that the coefficient of thermal conductivity of the coating film formed using the zinc oxide of Comparative Example 7 was very low because the zinc oxide was scraped by the glass rod in applying the coating liquid due to the large particle diameter of the zinc oxide. As can be understood from the above results, the average particle diameter of the thermally conductive oxide to be used in a coating liquid is preferably sufficiently small relative to the thickness of the coating film to be formed. In addition, a nylon film as an external film for batteries was coated by the use of a gravure coater with the coating liquid prepared using the thermally conductive oxide of Example 11, thereby using the coating liquid as a top coat for an external material for batteries. As a result, it was found that the heat can be dissipated effectively, and the increase in the temperature of a battery can be reduced. The method of measuring the thermal emissivity is described below.

(Measurement of Thermal Emissivity)

A resin shaped body having an area of 40 mm in length× 40 mm in width and a thickness of 1 mm or less and having a smooth surface was prepared as a test piece. The thermal emissivity of the prepared test piece was measured using an emissivity meter (trade name "D and S AERD", manufactured by Kyoto Electronics Manufacturing Co., Ltd.).

<Preparation and Evaluation of Adhesive>

A dispersion liquid was prepared by mixing 35 parts of the thermally conductive oxide of Example 11 and 65 parts of a polyester polyol having a viscosity of 300 mPa·s, and then dispersing the resultant mixture using a paint shaker, and further, two dispersion liquids were prepared in the same manner as described above except that the thermally conductive oxide of Comparative Example 5 was used in place of the thermally conductive oxide of Example 11 in one coating liquid, and the thermally conductive oxide of Comparative Example 7 was used in place of the thermally conductive oxide of Example 11 in the other coating liquid. Urethane resin-based chemical reaction type adhesives were each obtained by mixing 98 parts of each of the prepared dispersion liquids and 2 pats of polyisocyanate having a viscosity of 2,600 mPa·s, and stirring the resultant mixture using a disper. Each obtained adhesive was applied on release paper uniformly using a glass rod, and the release paper was placed in an oven of 100° C. for 2 minutes to evaporate the solvent component. Further, the release paper was placed in an oven of 40° C. for 96 hours to form a cured film of the adhesive. The coefficient of the cured film was measured to find that the cured film formed using the α-alumina of Comparative Example 5 had a coefficient of thermal conductivity of 0.51 W/mK. In addition, the cured film formed using the zinc oxide of Comparative Example 7 had a coefficient of thermal conductivity of 0.56 W/mK. In contrast, it was found that the cured film formed using the thermally conductive oxide of Example 11 had a high coefficient of thermal conductivity, as high as 0.67 W/mK.

<Production of Thermally Conductive Oxide (2)>

Examples 73 to 81

Powdered thermally conductive oxides were obtained in the same manner as the above-described "Production of Thermally Conductive Oxide (1)" except that the types and amounts of the aluminum starting materials and the additional starting materials described in Table 4 were used. It is to be noted that the compounds described below were used as the starting materials in Table 4.

Aluminum hydroxide A: spherical shape, number average particle diameter of 6.5 μm Aluminum hydroxide C: spherical shape, number average particle diameter of 1.2 μm α-alumina: spherical shape, number average particle diameter of 1.1 μm Titanium oxide: anatase, number average particle diameter of 0.15 μm Frit B: comprising B, Si, Mg, and Al as main components and having a softening point of 650° C.

TABLE 4

| | Aluminum starting material | | Additional starting material | | Production method | Number average particle diameter (μm) |
|---|---|---|---|---|---|---|
| | Type | Amount (parts) | Type | Amount (parts) | | |
| Example 73 | Aluminum hydroxide A | 100 | Magnesium chloride hexahydrate | 40 | Wet process | 6.5 |
| Example 74 | α-Alumina | 100 | Magnesium chloride hexahydrate | 40 | Wet process | 1.1 |
| Example 75 | Aluminum hydroxide A | 100 | Titanium oxide | 1 | Dry process | 6.5 |
| Example 76 | Aluminum hydroxide C | 100 | Titanium oxide | 1 | Dry process | 1.2 |
| Example 77 | Aluminum hydroxide C | 100 | Frit B | 1 | Dry process | 1.2 |
| | | | Sodium molybdate | 1 | | |
| Example 78 | Aluminum hydroxide C | 100 | Boric acid | 1 | Dry process | 1.2 |
| Example 79 | Aluminum hydroxide C | 100 | Frit B | 1 | Dry process | 1.2 |
| Example 80 | Aluminum hydroxide C | 100 | Sodium molybdate | 1 | Dry process | 1.2 |
| Example 81 | Aluminum hydroxide C | 100 | Boric acid | 1 | Dry process | 1.2 |
| | | | Sodium molybdate | 1 | | |

<Production of Liquid Composition>

Examples 82 to 93 and Comparative Examples 11 to 20

Liquid dispersions were obtained by mixing the types and amounts of the respective components described in Table 5 and stirring the resultant mixtures using a paint shaker (glass beads (diameter of 2 mm) were used). Liquid compositions were each obtained by adding 3 parts of a polyisocyanate resin (trade name "TAKENATE D-160N", manufactured by Mitsui Chemicals, Inc., resin content of 75%, solvent content of 25%) based on 100 parts of each of the obtained dispersion liquids, and then stirring the resultant mixture. It is to be noted that the following compounds were used as the "resin for forming film" and the "solvent" in Table 5.

Resin for forming film: polyurethane resin (trade name "SANPRENE IB-1700D", manufactured by Sanyo Chemical Industries, Ltd., resin content of 30%, solvent content of 70%)

Solvent: mixed solvent of methyl ethyl ketone/toluene/isopropyl alcohol

TABLE 5

| | Thermally conductive component | | | | Number average particle diameter (μm) | Solvent | | |
|---|---|---|---|---|---|---|---|---|
| | Thermally conductive oxide | | Additional component | | | Resin for foming film (parts) | Content for dissolving resin (parts) | Content added (parts) |
| | Type | Amount (parts) | Type | Amount (parts) | | | | |
| Example 82 | Example 73 | 20 | — | — | 6.5 | 19 | 44 | 17 |
| Example 83 | Example 74 | 20 | — | — | 1.1 | 19 | 44 | 17 |
| Example 84 | Example 75 | 20 | — | — | 6.5 | 19 | 44 | 17 |
| Example 85 | Example 76 | 20 | — | — | 1.2 | 19 | 44 | 17 |
| Example 86 | Example 77 | 20 | — | — | 1.2 | 19 | 44 | 17 |
| Example 87 | Example 78 | 20 | — | — | 1.2 | 19 | 44 | 17 |
| Example 88 | Example 79 | 20 | — | — | 1.2 | 19 | 44 | 17 |
| Example 89 | Example 80 | 20 | — | — | 1.2 | 19 | 44 | 17 |
| Example 90 | Example 81 | 20 | — | — | 1.2 | 19 | 44 | 17 |
| Example 91 | Example 73 | 10 | Barium sulfate | 10 | — | 19 | 44 | 17 |
| Example 92 | Example 73 | 10 | Talc | 10 | — | 19 | 44 | 17 |
| Example 93 | Example 73 | 10 | Boron nitride | 10 | — | 19 | 44 | 17 |
| Comparative Example 11 | — | — | Barium sulfate | 20 | 0.9 | 19 | 44 | 17 |
| Comparative Example 12 | — | — | Aluminum hydroxide C | 20 | 1.2 | 19 | 44 | 17 |
| Comparative Example 13 | — | — | α-Alumina | 20 | 3.1 | 19 | 44 | 17 |
| Comparative Example 14 | — | — | Talc | 20 | 4.3 | 19 | 44 | 17 |
| Comparative Example 15 | — | — | Magnesium oxide | 20 | 3.0 | 19 | 44 | 17 |
| Comparative Example 16 | — | — | Zinc oxide | 20 | 20.0 | 19 | 44 | 17 |
| Comparative Example 17 | — | — | Zinc oxide | 20 | 2.0 | 19 | 44 | 17 |
| Comparative Example 18 | — | — | Aluminum nitride | 20 | 15.0 | 19 | 44 | 17 |
| Comparative Example 19 | — | — | Aluminum nitride | 20 | 2.0 | 19 | 44 | 17 |
| Comparative Example 20 | — | — | Boron nitride | 20 | 4.0 | 19 | 44 | 17 |

<Evaluation (2)>
(Formation of Coating Film)

The liquid compositions were each applied on release paper using a Multi Coater (trade name "K-303", manufactured by RK Print Coat Instruments Ltd.), and the release paper was then subjected to hot-air drying to remove the solvent. Subsequently, the release paper was subjected to aging in a dryer of 40° C. for 48 hours to form a coating film for evaluation having a concentration of the thermally conductive component (filler) of 48% and a film thickness of about 100 μm.

(Measurement of Coefficient of Thermal Conductivity (Thin Film))

The coating film for evaluation was cut out to obtain a test piece having a size of 40 mm in length×40 mm in width. The coefficient of thermal conductivity of the obtained test piece was measured with a "thin film-measuring module" of a thermophysical property-measuring apparatus (trade name "TPS-2500S", manufactured by Kyoto Electronics Manufacturing Co., Ltd.). The results are shown in Table 6.

(Measurement of Coefficient of Thermal Conductivity (Block))

Each resin composition obtained by mixing 50 parts of polypropylene (manufactured by Prime Polymer Co., Ltd., MFR of 20 g/10 min) and 50 parts of each thermally conductive oxide was placed in a plastomill and was then melt-kneaded under a condition of a preset temperature of 200° C. Subsequently, the melt-kneaded product was subjected to metallic mold pressing using a metallic mold of 20 mm in length×20 mm in width×6 mm in height under a condition of 175° C. to obtain a test piece. The coefficient of thermal conductivity of the obtained test piece was measured with a "standard isotropy-measuring module" of a thermophysical property-measuring apparatus (trade name "TPS-2500S", manufactured by Kyoto Electronics Manufacturing Co., Ltd.). The results are shown in Table 6.

(Wettability)

A dispersion liquid was obtained by mixing 50 parts of a polyol (trade name "KURARAY POLYOL P-1010", manufactured by KURARAY Co., Ltd., viscosity (25° C.) of 1,500 kPa·s) and 50 parts of the thermally conductive oxide. The solution viscosity (25° C., number of revolutions of 0.5 rpm) of the obtained dispersion liquid was measured using an E type rotational viscometer to evaluate the wettability of the thermally conductive oxide to a resin according to the evaluation criteria described below. The results are shown in Table 6.

Excellent: solution viscosity of 2,000 mPa·s or more and less than 5,000 mPa·s

Good: solution viscosity of 5,000 mPa·s or more and less than 15,000 mPa·s

Fair: solution viscosity of 15,000 mPa·s or more and less than 25,000 mPa·s

Poor: solution viscosity of 25,000 mPa·s or more (Chemical Resistance)

The coating film for evaluation was cut out to obtain a test piece having a size of 40 mm in length×40 mm in width×100 m in thickness. The obtained test piece was immersed in 5% hydrochloric acid, a 5% aqueous sulfuric acid solution, a 5% aqueous nitric acid solution, and a 5% aqueous sodium hydroxide solution in such a way that the test piece immersed in each solution was stirred once every day and left to stand for 1 week in each solution. The mass of the test piece before the immersion and the mass of the test piece after the immersion were measured, and a rate (%) of a change in the mass based on the mass of the test piece before the immersion was calculated to evaluate the chemical resistance according to the evaluation criteria described below. The results are shown in Table 6. Good: rate of change in mass of less than 5% Fair: rate of change in mass of 5% or more and less than 20%

Poor: rate of change in mass of 20% or more (Measurement of Thermal Emissivity)

The coating film for evaluation was cut out to obtain a test piece having a size of 40 mm in length×40 mm in width. The thermal emissivity of the obtained test piece was measured using an emissivity meter (trade name "D and S AERD", manufactured by Kyoto Electronics Manufacturing Co., Ltd.). The results are shown in Table 6.

(Adhesiveness)

For a biaxially stretched polyester film (trade name "ESTER Film E-5102", manufactured by Toyobo Co., Ltd.) and a biaxially stretched nylon film (trade name "HARDEN Film N1102, manufactured by Toyobo Co., Ltd.), a corona-treated surface (treated PET, treated NY) and an untreated surface (untreated PET, untreated NY) were coated with the liquid composition using a #5 bar coater. Solvents were removed by hot-air drying, the resultant films were subjected to aging in a dryer of 40° C. for 48 hours to prepare test pieces each having a thin film formed on the film surface. A cellophane tape (trade name "CELLOTAPE®", manufactured by Nichiban Co., Ltd., 24 mm wide) was adhered to each surface of the thin films of the test pieces, the operation of peeling the cellophane tape in a vertical direction was then repeated at the same portion 3 times, and thereafter the states of the thin films were checked to evaluate the adhesiveness according to the evaluation criteria described below. The results are shown in Table 6.

Good: peeling does not occur
Fair: peeling occurs in a part of adhered tape
Poor: peeling occurs in the most part of adhered tape Example 94

The surface of an aluminum member was coated with the liquid composition of Example 85. The solvent was removed by hot-air drying, and the resultant aluminum member was subjected to aging in a dryer of 40° C. for 48 hours to prepare a test piece having a thin film formed on the surface of the member. The coefficient of thermal conductivity of the prepared test piece was measured in the same manner as described in "Measurement of Coefficient of Thermal Conductivity (Thin Film)" of "Evaluation (2)" was measured. As a result, it was made clear that the value of the coefficient of thermal conductivity of the test piece was sufficiently high not to deteriorate the coefficient of thermal conductivity of aluminum. In addition, the thermal emissivity of the test piece measured in the same manner as described in "Measurement of Thermal Emissivity" of "Evaluation (2)" was 0.50, and it was made clear that the thermal emissivity of the test piece was improved when compared to the thermal emissivity of aluminum itself (0.03). Further, the formed thin film had a high adhesiveness to the surface of the aluminum member.

Example 95

A liquid composition was prepared by blending 20 parts of the thermally conductive oxide of Example 76, 61 pats of water, and 19 parts of an aqueous polyurethane resin as the resin for forming a film. The surface of an aluminum member was coated with the prepared liquid composition, and the solvent was then removed by hot-air drying. Sub-

TABLE 6

| | Coefficient of thermal conductivity (W/mK) | | | | | Emissivity | Adhesiveness | | | |
|---|---|---|---|---|---|---|---|---|---|---|
| | | | Wettability | Chemical resistance | | | Treated | Untreated | Treated | Untreated |
| | Thin film | Block | | Acid | Alkali | (−) | PET | PET | NY | NY |
| Example 82 | 0.32 | 0.54 | Good | Good | Good | 0.93 | Good | Good | Good | Good |
| Example 83 | 0.36 | 0.57 | Good | Good | Good | 0.92 | Good | Good | Good | Good |
| Example 84 | 0.29 | 0.64 | Excellent | Good | Good | 0.91 | Good | Good | Good | Good |
| Example 85 | 0.54 | 0.75 | Fair | Good | Good | 0.91 | Good | Good | Good | Good |
| Example 86 | 0.45 | 0.65 | Good | Good | Good | 0.92 | Good | Good | Good | Good |
| Example 87 | 0.36 | 0.51 | Fair | Good | Good | 0.92 | Good | Good | Good | Good |
| Example 88 | 0.36 | 0.55 | Fair | Good | Good | 0.92 | Good | Good | Good | Good |
| Example 89 | 0.39 | 0.58 | Fair | Good | Good | 0.92 | Good | Good | Good | Good |
| Example 90 | 0.42 | 0.63 | Good | Good | Good | 0.92 | Good | Good | Good | Good |
| Example 91 | 0.31 | 0.45 | Good | Good | Good | 0.92 | Good | Good | Good | Good |
| Example 92 | 0.40 | 0.57 | Fair | Good | Fair | 0.91 | Good | Good | Good | Good |
| Example 93 | 0.62 | 0.72 | Fair | Good | Fair | 0.90 | Good | Good | Good | Good |
| Comparative Example 11 | 0.22 | 0.33 | Good | Good | Good | 0.91 | Good | Good | Good | Good |
| Comparative Example 12 | 0.40 | 0.58 | Good | Poor | Poor | 0.91 | Good | Good | Good | Good |
| Comparative Example 13 | 0.31 | 0.45 | Excellent | Good | Good | 0.92 | Good | Good | Good | Good |
| Comparative Example 14 | 0.36 | 0.61 | Poor | Good | Poor | 0.91 | Fair | Fair | Fair | Fair |
| Comparative Example 15 | 0.33 | 0.51 | Excellent | Poor | Good | 0.902 | Good | Good | Good | Good |
| Comparative Example 16 | 0.18 | 0.47 | Excellent | Poor | Good | 0.9 | Good | Good | Good | Good |
| Comparative Example 17 | 0.39 | 0.50 | Excellent | Poor | Good | 0.91 | Good | Good | Good | Good |
| Comparative Example 18 | 0.32 | 0.53 | Excellent | Good | Poor | 0.87 | Good | Good | Good | Good |
| Comparative Example 19 | 0.54 | 0.70 | Good | Good | Poor | 0.89 | Good | Good | Good | Good |
| Comparative Example 20 | 0.69 | 0.90 | Poor | Good | Poor | 0.87 | Good | Good | Good | Good | sequently, the resultant aluminum member was subjected to aging in a dryer of 40° C. for 48 hours to prepare a test piece having a thin film formed on the surface of the member. The coefficient of thermal conductivity of the prepared test piece was measured in the same manner as described in "Measurement of Coefficient of Thermal Conductivity (Thin Film)" of "Evaluation (2)" was measured. As a result, it was made clear that the value of the coefficient of thermal conductivity of the test piece was sufficiently high not to deteriorate the coefficient of thermal conductivity of aluminum. In addition, the thermal emissivity of the test piece measured in the same manner as described in "Measurement of Thermal Emissivity" of "Evaluation (2)" was higher than the thermal emissivity of aluminum itself (0.03). Further, the formed thin film had a high adhesiveness to the surface of the aluminum member.

The invention claimed is:
1. An alumina-containing thermally conductive oxide,
wherein the alumina-containing thermally conductive oxide is a fired product of a starting material mixture obtained by firing the starting material mixture at a temperature in a range from 600 to 1,500° C.,
the starting material mixture comprises:
an aluminum starting material, the aluminum starting material being at least one material selected from the group consisting of boehmite, aluminum hydroxide, and alumina; and
an additional starting material comprising a molybdenum compound and one material selected from the group consisting of a frit, a boric acid compound, and a combination thereof,
a content of the additional starting material in the starting material mixture is in a range from 0.1 to 20 parts by mass relative to 100 parts by mass of the aluminum starting material,
the frit is a multi-component glass and comprises:
Si; and
at least one element selected from the group consisting of Li, B, Na, K, Mg, Ca, Al, Zn, F, Ti, Zr, and P, and
the frit is not colored and substantially comprises no Pb, and
the alumina-containing thermally conductive oxide comprises a reaction product of part of the starting material mixture, the reaction product being formed during the firing.
2. The alumina-containing thermally conductive oxide according to claim 1, wherein the aluminum starting material has a spherical shape and has a number average particle diameter in a range from 0.1 to 80 μm.
3. A method for producing the alumina-containing thermally conductive oxide according to claim 1, the method comprising:
mixing the at least one aluminum starting material with the additional starting material in an amount in the range from 0.1 to 20 parts by mass relative to 100 parts by mass of the aluminum starting material, so that the starting material mixture is obtained; and
firing the obtained starting material mixture at a temperature in the range from 600 to 1,500° C.,
wherein during the firing, part of the starting material mixture reacts, and the reaction product is included the alumina-containing thermally conductive oxide.
4. The method for producing the alumina-containing thermally conductive oxide according to claim 3,
wherein the starting material mixture is obtained by mixing the aluminum starting material with the additional starting material by a wet process or a dry process.
5. A thermally conductive composition comprising:
the alumina-containing thermally conductive oxide according to claim 1; and
a thermally conductive filler.
6. An article comprising the alumina-containing thermally conductive oxide according to claim 1.
7. The article according to claim 6, further comprising a thermally conductive filler.
8. The article according to claim 6, being any one of a gravure ink, a coating liquid, a resin composition, and an adhesive composition.
9. A liquid composition to be used for forming a thermally conductive thin film,
wherein the liquid composition comprises:
a thermally conductive component comprising the alumina-containing thermally conductive oxide according to claim 1;
a resin for forming a film; and
a solvent.
10. The liquid composition according to claim 9,
wherein the thermally conductive component further comprises at least one material selected from the group consisting of barium sulfate, talc, and boron nitride.
11. The liquid composition according to claim 9,
wherein a content of the thermally conductive component in the liquid composition is in a range from 20 to 200 parts by mass based on 100 parts by mass of the resin for forming a film.
12. The liquid composition according to claim 9,
wherein the resin for forming a film is at least one solvent-soluble resin selected from the group consisting of an acrylic-based resin, a urethane-based resin, a urea-based resin, an epoxy-based resin, a rubber-based resin, a fluorine-based resin, a polyamide-based resin, a polyimide-based resin, a silicone-based resin, a cellulose-based resin, and a thermoplastic elastomer.
13. A thermally conductive thin film formed through coating with the liquid composition according to claim 9.
14. A member for an electronic device, the member comprising:
a metallic member; and
the thermally conductive thin film according to claim 13 disposed on a surface of the metallic member.
15. The alumina-containing thermally conductive oxide according to claim 1, wherein the alumina-containing thermally conductive oxide is in a powder form.
16. The method for producing the alumina-containing thermally conductive oxide according to claim 3, the method further comprising pulverizing the resulting fired starting material mixture so as to obtain the fired product.

* * * * *